235-379 SR

9/11/84 XR 4,470,496

United States Patent [19]

Steiner

[11] Patent Number: 4,470,496

[45] Date of Patent: Sep. 11, 1984

[54] CONTROL CIRCUIT FOR BILL AND COIN CHANGER

[75] Inventor: Larry E. Steiner, Grand Rapids, Mich.

[73] Assignee: Rowe International Inc., Whippany, N.J.

[21] Appl. No.: 379,266

[22] Filed: May 17, 1982

Related U.S. Application Data

[62] Division of Ser. No. 074,992, Sep. 13, 1979, abandoned.

[51] Int. Cl.³ ........................ G07D 7/00; G06F 11/22

[52] U.S. Cl. .................................... 194/4 C; 209/534; 209/548; 235/379

[58] Field of Search ............... 209/534, 546, 548, 549, 209/551, 586; 194/4 R, 4 C, 4 E, 4 F, DIG. 25; 221/21; 235/379, 480; 382/7

[56] References Cited

U.S. PATENT DOCUMENTS

| | | | |
|---|---|---|---|
| 2,962,166 | 11/1960 | Miles et al. | 209/549 X |
| 3,264,630 | 8/1966 | Conklin | 209/548 X |
| 3,999,175 | 12/1976 | Thibodeau | 340/253 R |
| 4,096,991 | 6/1978 | Iguchi | 235/480 X |
| 4,109,246 | 8/1978 | Budrys et al. | 340/518 |
| 4,133,477 | 1/1979 | Marino et al. | 235/304 |
| 4,283,708 | 8/1981 | Lee | 209/534 X |
| 4,348,656 | 9/1982 | Gorgone et al. | 209/534 X |

*Primary Examiner*—Robert B. Reeves
*Assistant Examiner*—Edward M. Wacyra
*Attorney, Agent, or Firm*—Shenier & O'Connor

[57] ABSTRACT

A bill and coin changer in which a circuit employing a programmed microcomputer controls the bill-validating and coin-dispensing procedures and searches for faults in the operation of the sensors and electromechanical components of the changer. During bill validation, a bill is moved at a predetermined speed along a path past a plurality of sensors, and rejection signals are generated if a particular sensor is actuated for other than a predetermined permissible duration or generates a predetermined output within a test period delimited by the delayed output of the other sensors. In response to a rejection signal, the bill is returned to the customer and a diagnostic hexadecimal rejection code character is displayed indicating the condition prompting rejection. Jammed objects are extricated from the bill transport by alternatingly actuating the transport to move the object in one direction and then in the other upon sensing a jammed condition. When not engaged in a validating or coin-dispensing sequence, the control circuit sequentially interrogates in cyclical fashion a plurality of lines coupled to those sensors which should not be actuated during a quiescent period. If one of the lines is found to be erroneously actuated, the control circuit inhibits further acceptance of bills or coins and displays a diagnostic hexadecimal fault code character indicating the nature of the fault. The control circuit resumes normal operation if the fault does not involve an electromechanical component and later corrects itself. Failure of an electromechanical component or dispensing of an erroneous amount of change causes the power supply lines energizing these components to be disabled.

11 Claims, 38 Drawing Figures

164
C
E
350
348
162
346
344
342
130
+5VDC
160a
226
115VAC COMMON
250
115VAC HOT
30VAC
388
+40VDC
429
+30VDC
SHUTDOWN RELAY
170
148
+14VDC
130
+5VDC
526
IN
OUT
GRD
528
524
534
+5VDC
497
506
516
504
538
540
"40V"
512
514
"30V"
502
500
536
"14V"
520
522
"5V"
530
532
508
510
518
498
HIGH CURRENT SUPPLY
LOW VOLTAGE SUPPLY
30V
11.5V
496
494
115VAC

FIG. 9
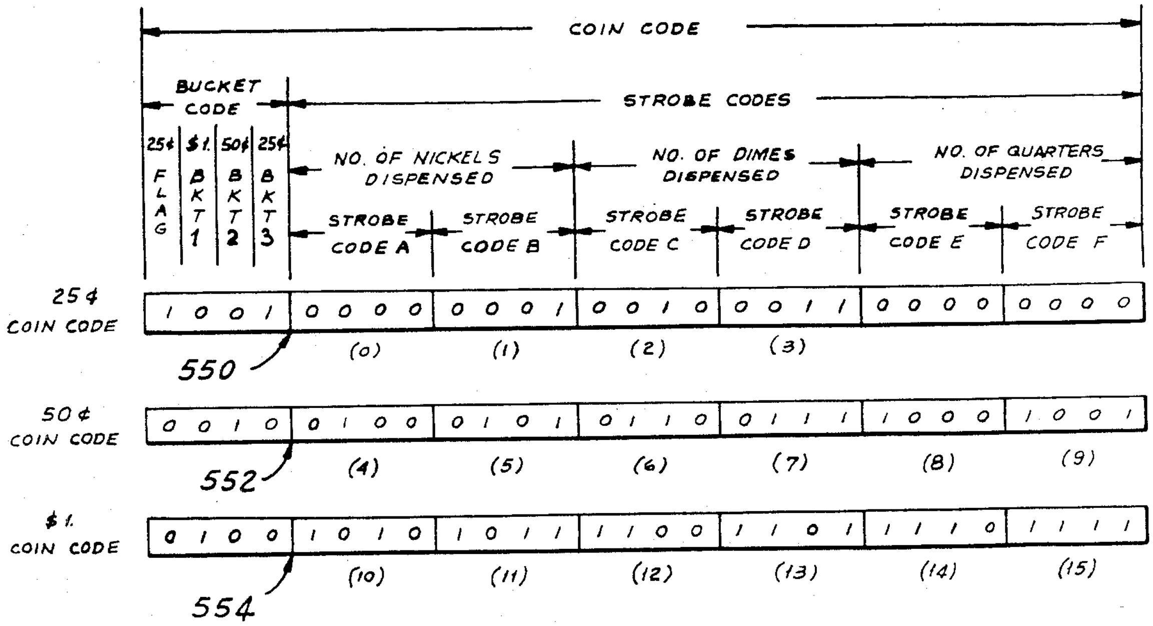
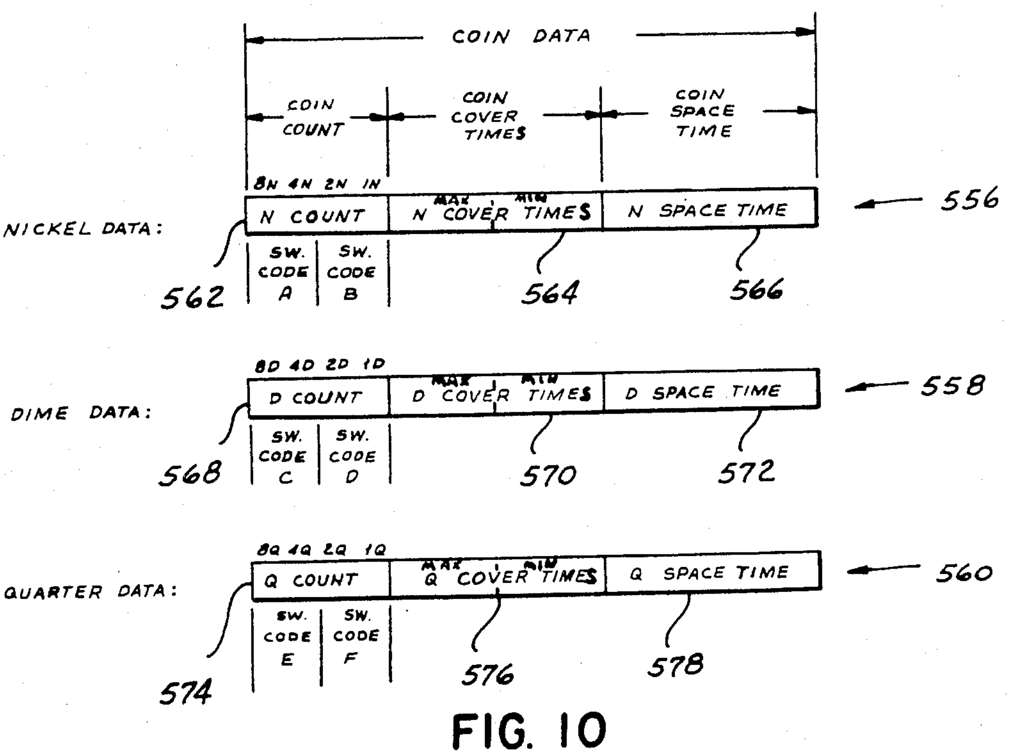
FIG. 10

CONTROL CIRCUIT FOR BILL AND COIN CHANGER

This is a division of application Ser. No. 074,992, filed Sept. 13, 1979, now abandoned.

BACKGROUND OF THE INVENTION

This invention relates to apparatus for controlling the operation of a currency changer and, in particular, to apparatus for controlling the operation of a currency changer including a paper currency acceptor.

Devices that perform one or more tests on U.S. one-dollar bills or other paper currency to determine their genuineness as a preliminary, for example, to dispensing change are well known in the art. Typically in such devices, the paper currency being validated is moved over a path along which various optical, magnetic or edge-sensing tests are performed. On failing any of these tests, the bill is moved along the path in a reverse direction to be returned to the user, and no credit is given. For example, in the apparatus disclosed in my prior patent, U.S. Pat. No. 3,966,047, a bill is moved along a path at a uniform rate of speed past a pair of photocells spaced farther apart than the length of the bill. If both photocells are covered simultaneously, the inserted object is rejected, since it cannot be a genuine bill.

Paper currency acceptors such as described in my prior patent, being sensitive only to simultaneous patterns of actuation of two or more edge sensors, in effect discard potentially valuable information indicative of attempts to defraud. For example, if a user attempts to cheat the currency acceptor by attaching a pull-back tape to the trailing edge of the bill, tension on the tape will tend to slow the transport motor or cause slippage, increasing the period during which a given sensor is actuated as well as the delay between the actuation of two successive sensors. An acceptor of the type described, however, will only sense the tape if it happens to actuate one of the sensors, as it is insensitive to changes in speed. While such acceptors typically subject the bill to one or more additional tests, their failure to detect an initial attempt to cheat increases the chance that such an attempt will be successful.

Paper currency acceptors of the prior art also present problems of adjustment to accept a reasonable range of acceptable bills which may be dirty or tattered to a greater or lesser degree. Since, typically, the events precipitating rejection follow in relatively close succession, it is difficult to identify the particular malfunction which results in rejection of a genuine bill within the range or acceptance of a spurious bill without individually testing a multiplicity of points in the electronic circuit. Such a trial-and-error approach obviously increases the labor costs of repair, particularly where the bill is subjected to a large number of tests.

Finally, with paper currency acceptors of the prior art, there is always the chance that an inserted bill, particularly if it is worn or has torn edges, will become jammed in the transport. The acceptor must then remain out of service until a serviceman is available.

Paper currency acceptors are often incorporated into bill and coin changers, the coin-accepting and coin-dispensing portions of which present problems similar or analogous to those discussed above. Thus, a mechanical or electrical component failure can often be identified only by a trial-and-error technique of testing individual points in the circuit, again resulting in high labor costs.

Further, unless proper action is quickly taken, certain failures can result in injury to other components, as burning out a solenoid or other electromechanical component. Component failures or erroneous sequences of operation in the coin-dispensing portion of a bill and coin changer can also be costly if they result in "jackpotting", or the uncontrolled dispensing of change. Even in the absence of solenoid burnout or jackpotting, improper operation of a bill and coin changer is highly undesirable if money inserted by a user is accepted without proper change being given.

SUMMARY OF THE INVENTION

One of the objects of my invention is to provide a paper currency acceptor which reliably detects attempts to obtain credit fraudulently.

Another object of my invention is to provide a paper currency acceptor which reliably detects attempts to pull the currency back after initial insertion.

Still another object of my invention is to provide a paper currency acceptor which reliably accepts genuine bills while reliably rejecting counterfeit bills.

Yet another object of my invention is to provide a paper currency acceptor which is relatively insensitive to changes in electronic circuit parameters.

Another object of my invention is to provide a paper currency acceptor which can detect and dislodge objects that have become jammed in the transport path.

Still another object of my invention is to provide a paper currency acceptor which is readily adjusted to accept genuine bills within a reasonable range of genuine bills.

Another object of my invention is to provide a control circuit for a bill and coin changer which facilitates detection and repair of mechanical or electronic component failures.

Still another object of my invention is to provide a control circuit for a bill and coin changer which prevents the uncontrolled dispensing of change in the event of component failure.

Yet another object of my invention is to provide a control circuit for a bill and coin changer which prevents the failure of one component from causing the failure of other components.

Still another object of my invention is to provide a control circuit for a bill and coin changer which prevents the dispensing of erroneous change combinations.

Other and further objects of my invention will be apparent from the following description.

In one aspect, my invention contemplates apparatus for validating documents such as paper currency having a predetermined length in which a document moving at predetermined speed along a path actuates a sensor positioned adjacent to the path to produce a rejection signal if the sensor is actuated for other than a predetermined permissible duration.

In another aspect, my invention contemplates apparatus for validating documents such as paper currency in which a document is moved at a predetermined speed along a path past first and second sensors disposed along the path and is rejected if the second sensor generates a predetermined output within a test period delimited by the delayed output of the first sensor.

In yet another aspect, my invention contemplates a document acceptor in which a document is moved along a path by a document transport and in which, in response to the sensing of the existence of an abnormal condition along the path, the document transport is alternatingly actuated to move the document first in one direction and then in the other in an attempt to free the document if it has become jammed.

In another aspect, my invention contemplates a currency acceptor which has one or more electrical lines that are properly actuated only after introduction of an article of currency to be credited and which is rendered inoperative if any of the electrical lines are actuated prior to the introduction of the article of currency.

In another aspect, my invention contemplates a currency acceptor which is normally in a standby mode, enters an acceptance mode in response to the introduction of an article of currency to be credited, and re-enters the standby mode after generating credit for the article introduced. While in the standby mode, the currency acceptor sequentially interrogates in a cyclical manner a plurality of electrical lines that are properly actuated only during the acceptance mode and inhibits entry into the acceptance mode if any of the interrogated lines are found to be actuated. Preferably the currency acceptor continues to interrogate the lines after inhibition of the acceptance mode and is responsive to the subsequent deactuation of the actuated line to discontinue its inhibiting action.

In still another aspect, my invention contemplates apparatus for validating a document which performs a plurality of tests on a document probative of its genuineness and which, in response to the detection of a spurious document by any one of the tests, generates a signal indicating the identity of the test.

In another aspect, my invention contemplates a currency acceptor which has a plurality of signal lines and which, in response to the sensing of a signal on one of the lines indicative of faulty operation of the acceptor, provides a visual display identifying the line carrying the signal.

In another aspect, my invention contemplates a currency changer which dispenses a manually preselected change combination in response to the introduction of an article of currency to be changed and which observably indicates the manual selection of a change combination different in total monetary value from the introduced article of currency.

In another aspect, my invention contemplates a currency changer which accumulates a change combination to be released in response to the introduction of an article of currency and inhibits the further introduction of currency if the proper change combination fails to be accumulated within a predetermined period following initiation of the accumulating operation.

In yet another aspect, my invention contemplates a currency changer which accumulates a change combination to be released in response to the introduction of an article of currency and inhibits further releasing if the releasing operation continues for longer than a predetermined period.

In yet another aspect, my invention contemplates a currency changer which accumulates a change combination to be released in response to the introduction of an article of currency and which inhibits the releasing of the change combination if the accumulating operation continues for longer than a predetermined period.

In still another aspect, my invention contemplates coin-dispensing apparatus in which a sensor responsive to the dispensing of individual coins feeds a counter which controls further dispensing and which is inhibited from responding to the sensor for a predetermined period following each initial actuation of the sensor.

In another aspect, my invention contemplates coin-dispensing apparatus in which a sensor responsive to the dispensing of individual coins feeds a counter which controls further dispensing and which is inhibited from responding to the sensor for a predetermined period following the termination of each actuation of the sensor.

In another aspect, my invention contemplates coin-dispensing apparatus in which a sensor responsive to the dispensing of individual coins feeds a counter which controls further dispensing upon upon reaching a predetermined count, and in which further dispensing of coins is inhibited if the sensor remains continuously actuated for longer than a predetermined period.

In yet another aspect, my invention contemplates apparatus in which a coin dispenser is repeatedly actuable to dispense a desired amount of change and in which further actuation of the coin dispenser is inhibited if more than a predetermined amount of change is cumulatively dispensed in excess of the desired amount of change.

BRIEF DESCRIPTION OF THE DRAWINGS

In the accompanying drawings which form part of the instant specification and which are to be read in conjunction therewith and in which like reference characters are used to indicate like parts in the various views.

FIGS. *2a* to *2c* are portions of a schematic diagram of the control circuit associated with my bill and coin changer.

Figures 3, 4:
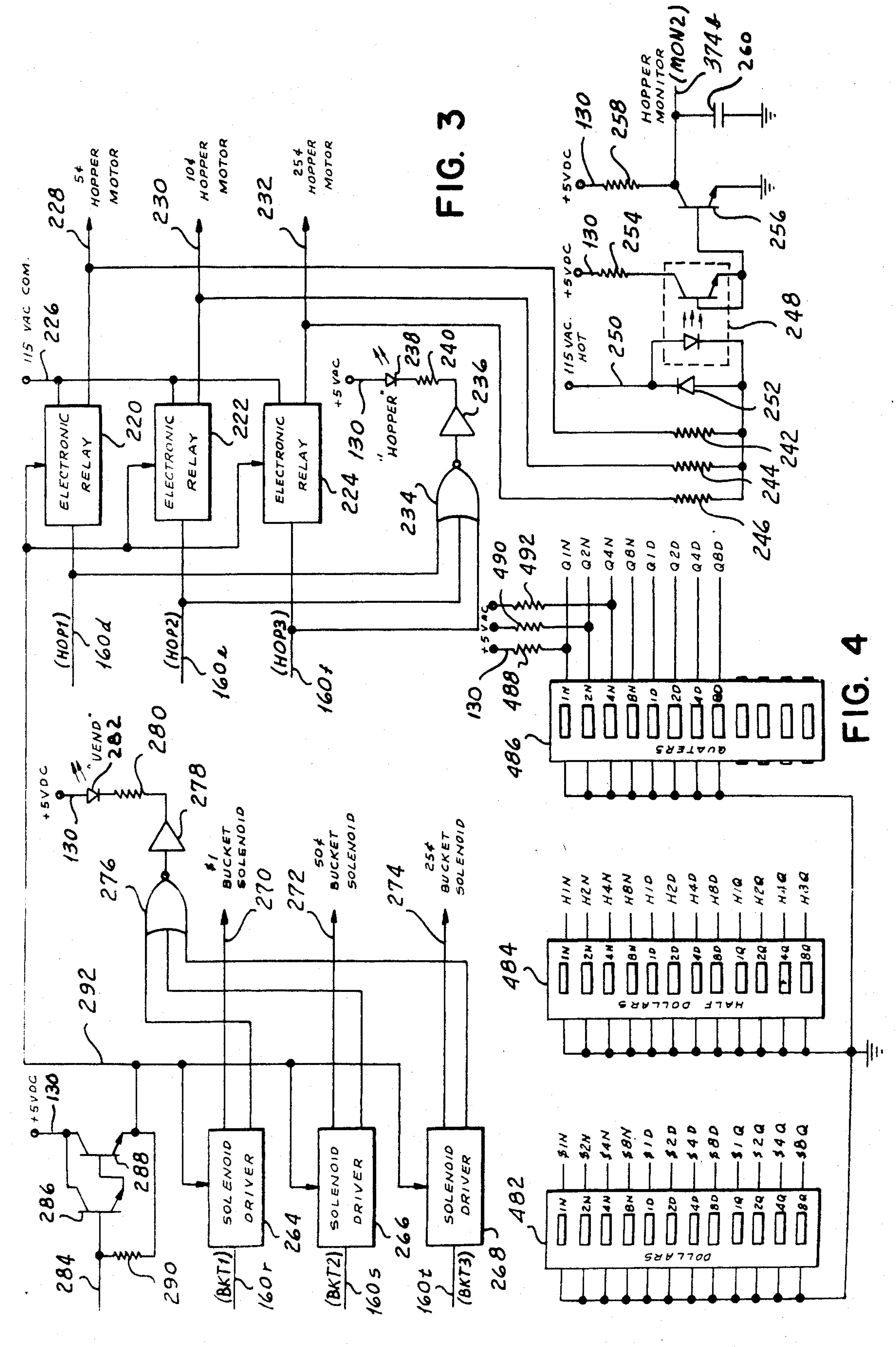

FIG. 3 is a schematic diagram of an additional portion of the output assembly of the control circuit shown in FIGS. *2a* to *2c*.

FIG. 4 is a schematic diagram of the change combination program switches associated with the circuit shown in FIGS. *2a* to *2c*.

Figure 5:
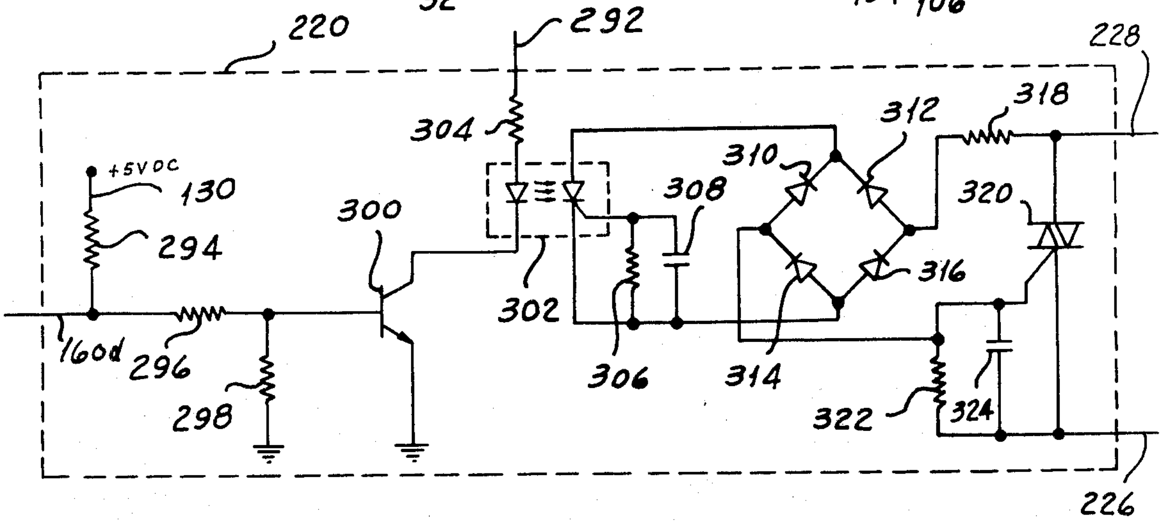

FIG. 5 is a schematic diagram of an electronic relay shown in block form in FIG. 3.

Figure 6:
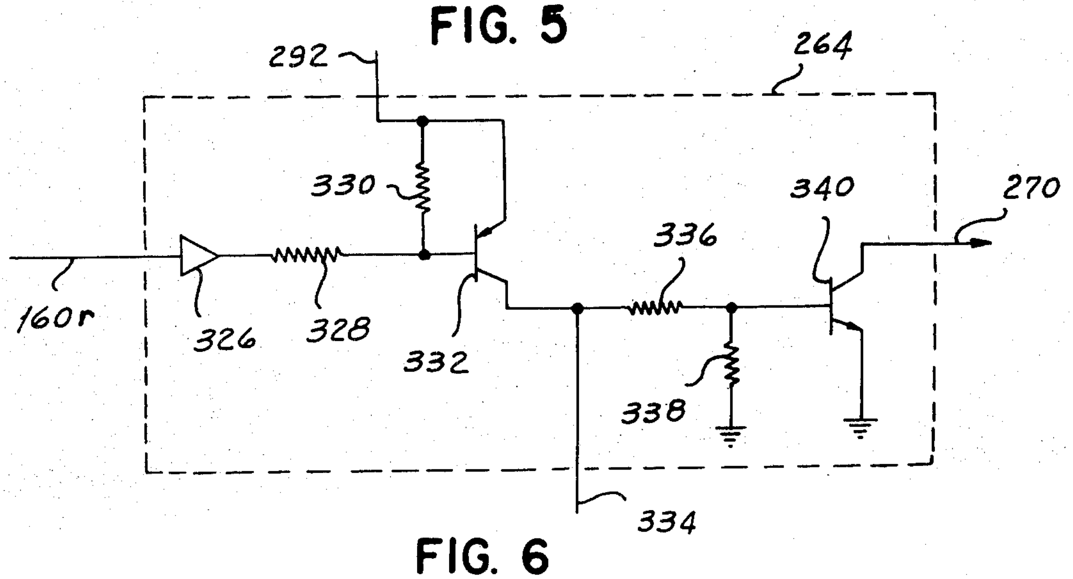

FIG. 6 is a schematic diagram of a solenoid driver shown in block form in FIG. 3.

Figures 7, 8:
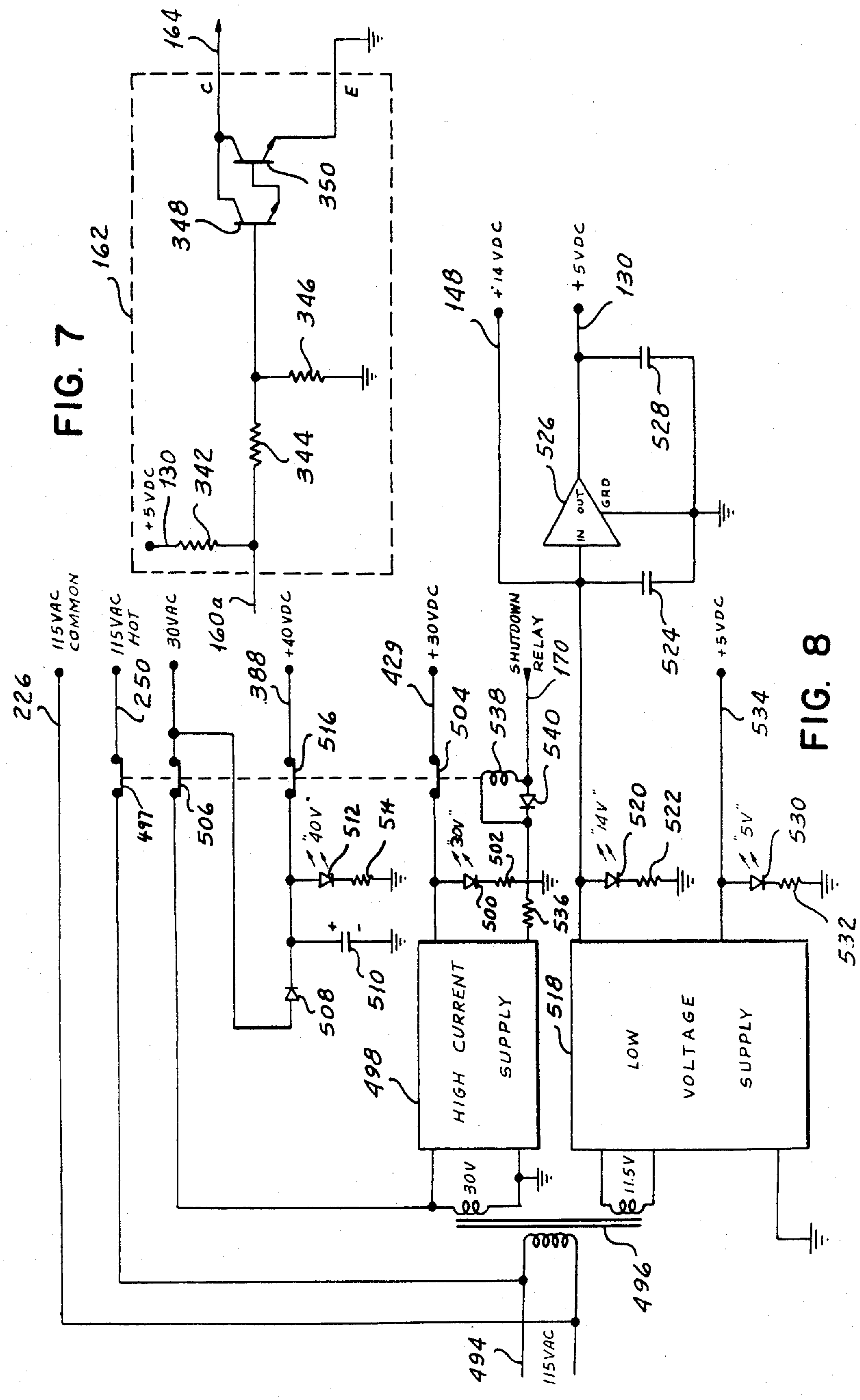

FIG. 7 is a schematic diagram of a driver circuit shown in block form in FIG. *2c*.

FIG. 8 is a schematic diagram of the power supply of the control circuit shown in FIGS. *2a* to *2c*.

FIG. 9 is a diagram illustrating the composition of the coin codes used in the circuit shown in FIGS. *2a* to *2c*.

FIG. 10 is a diagram illustrating the composition of the coin data registers used in the control circuit shown in FIGS. *2a* to *2c*.

Figure 11A:
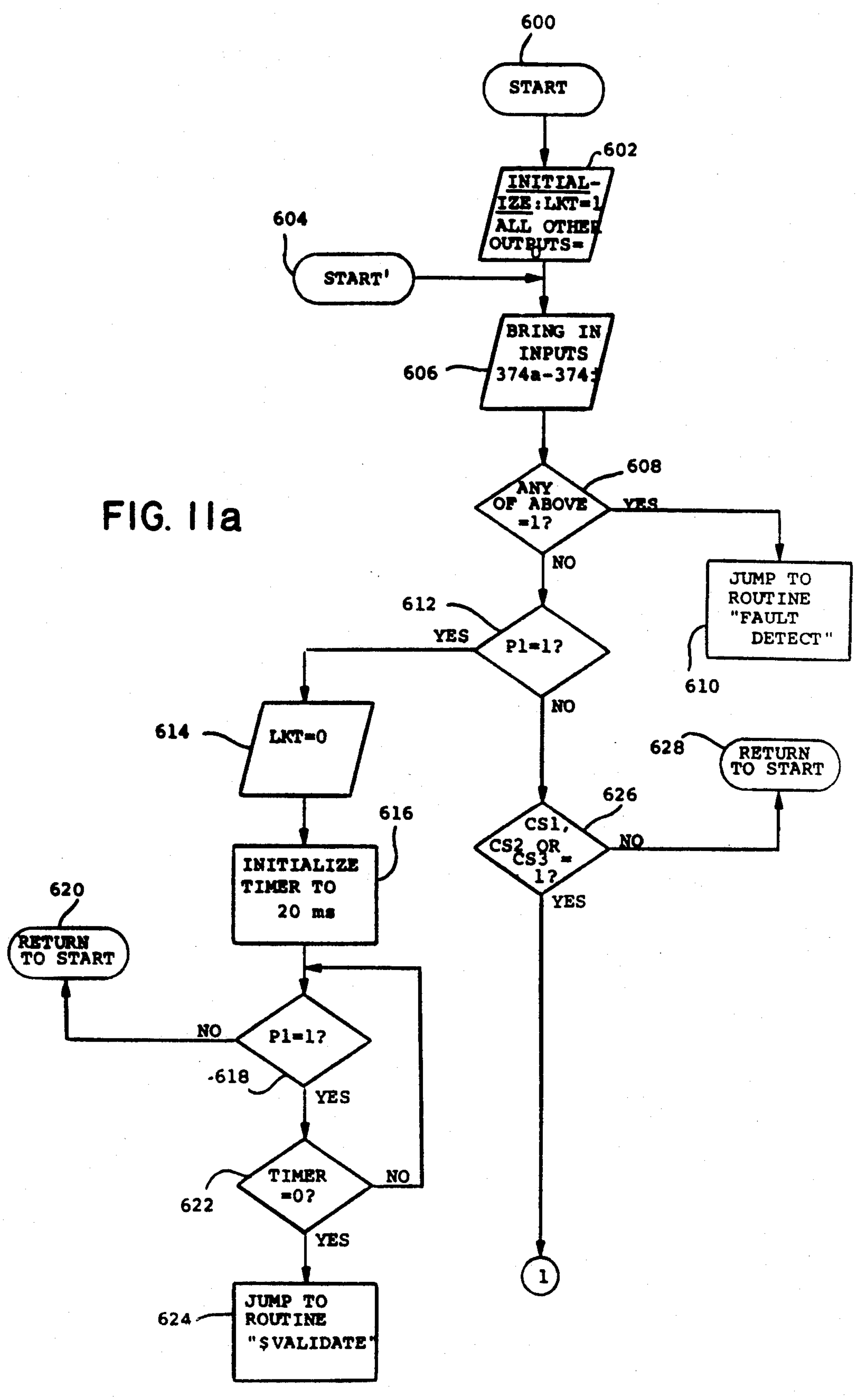
Figure 11B:
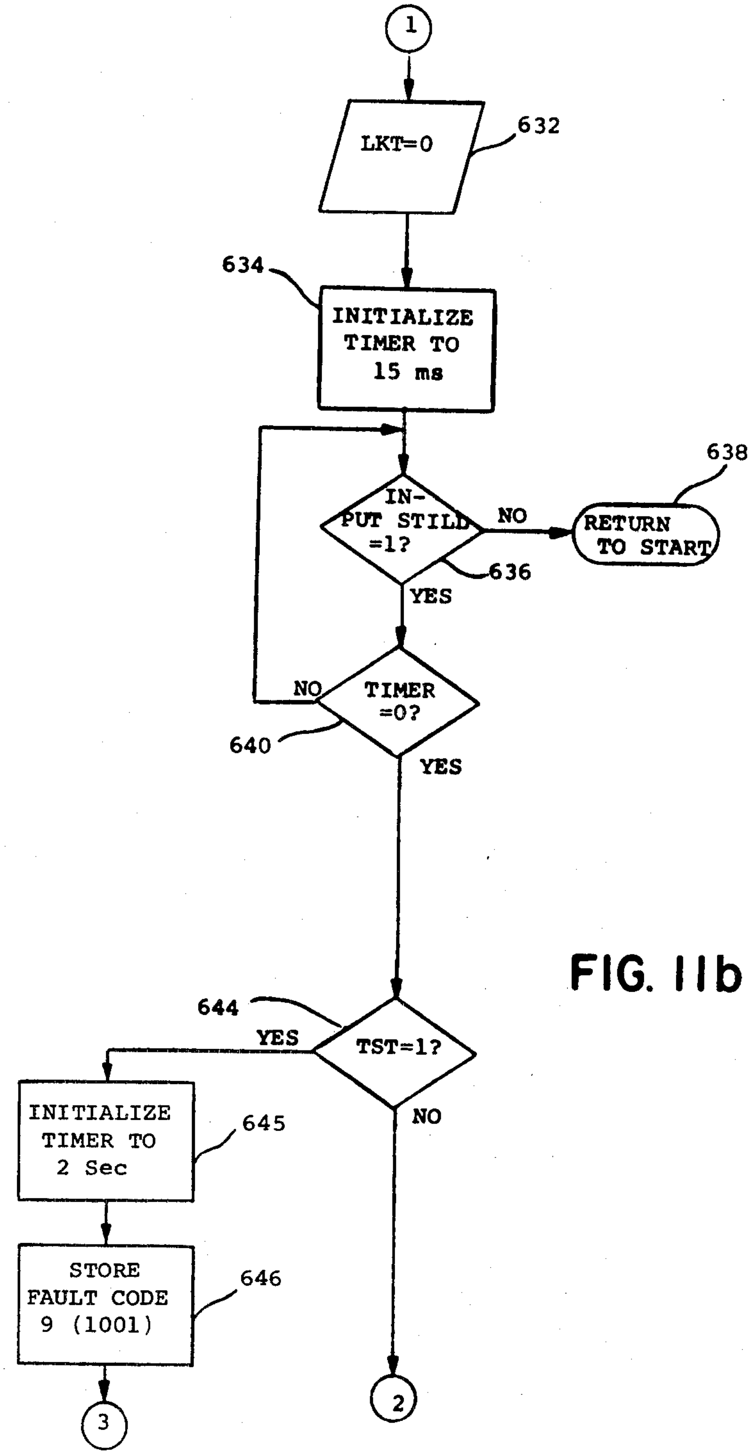
Figure 11C:
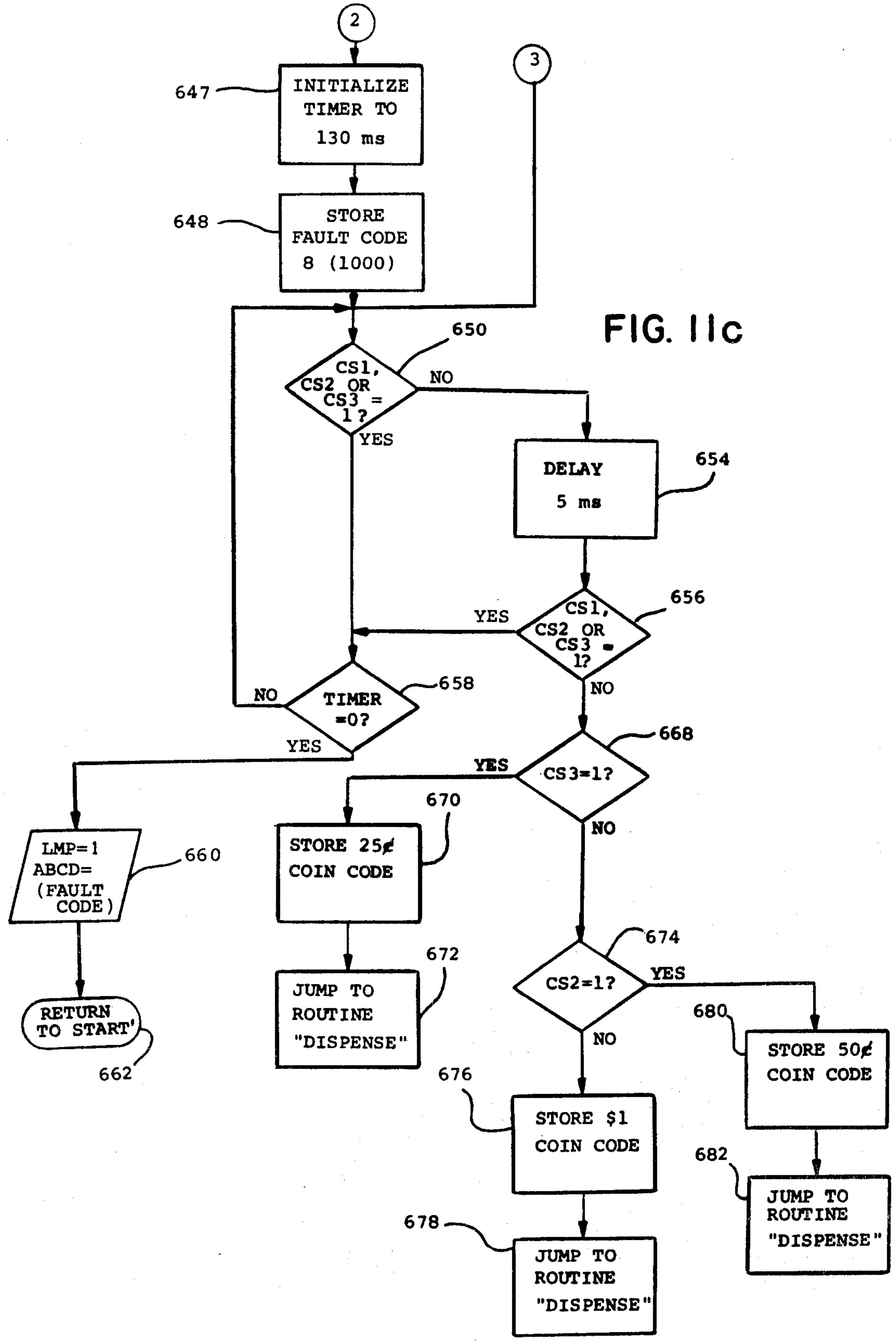

FIGS. 11*a* to 11*c* are a flowchart of the main program of the control circuit shown in FIGS. *2a* to *2c*.

Figure 12:
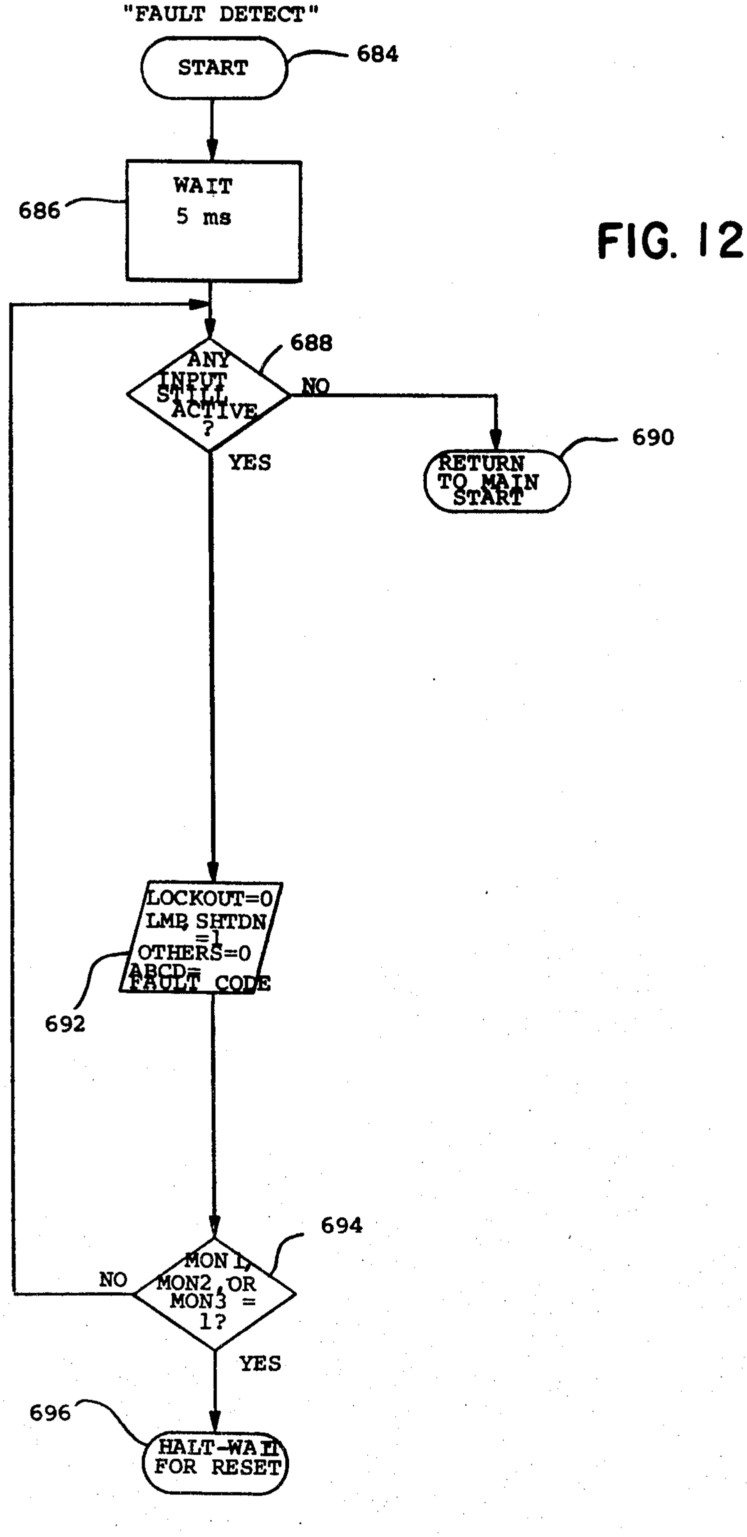

FIG. 12 is a flowchart of the fault-detecting routine of the control circuit shown in FIGS. *2a* to *2c*.

FIGS. 13*a* to 13*k* are a flowchart of the bill-validating routine of the control circuit shown in FIGS. *2a* to *2c*.

Figure 13A:
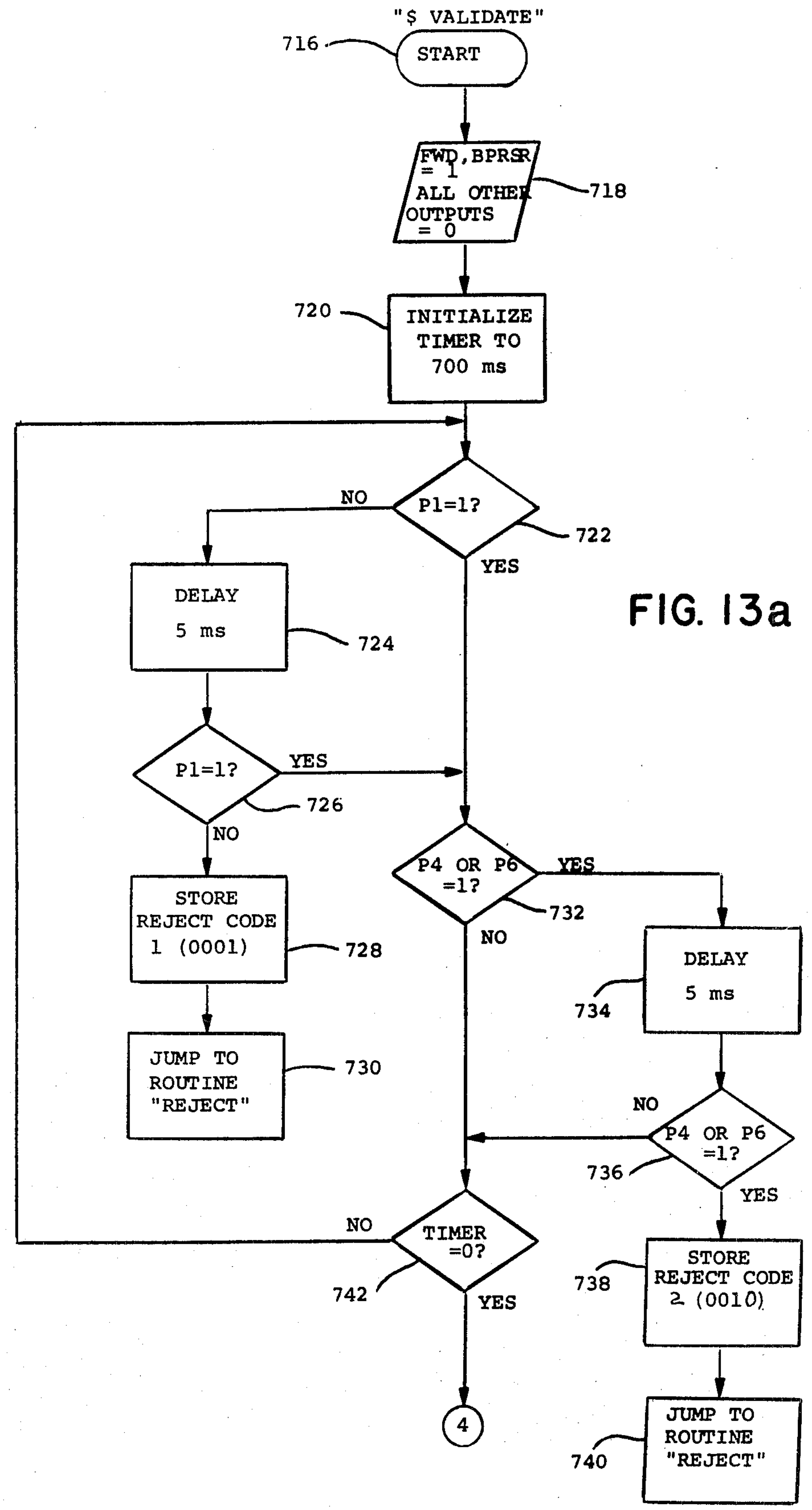
Figure 13B:
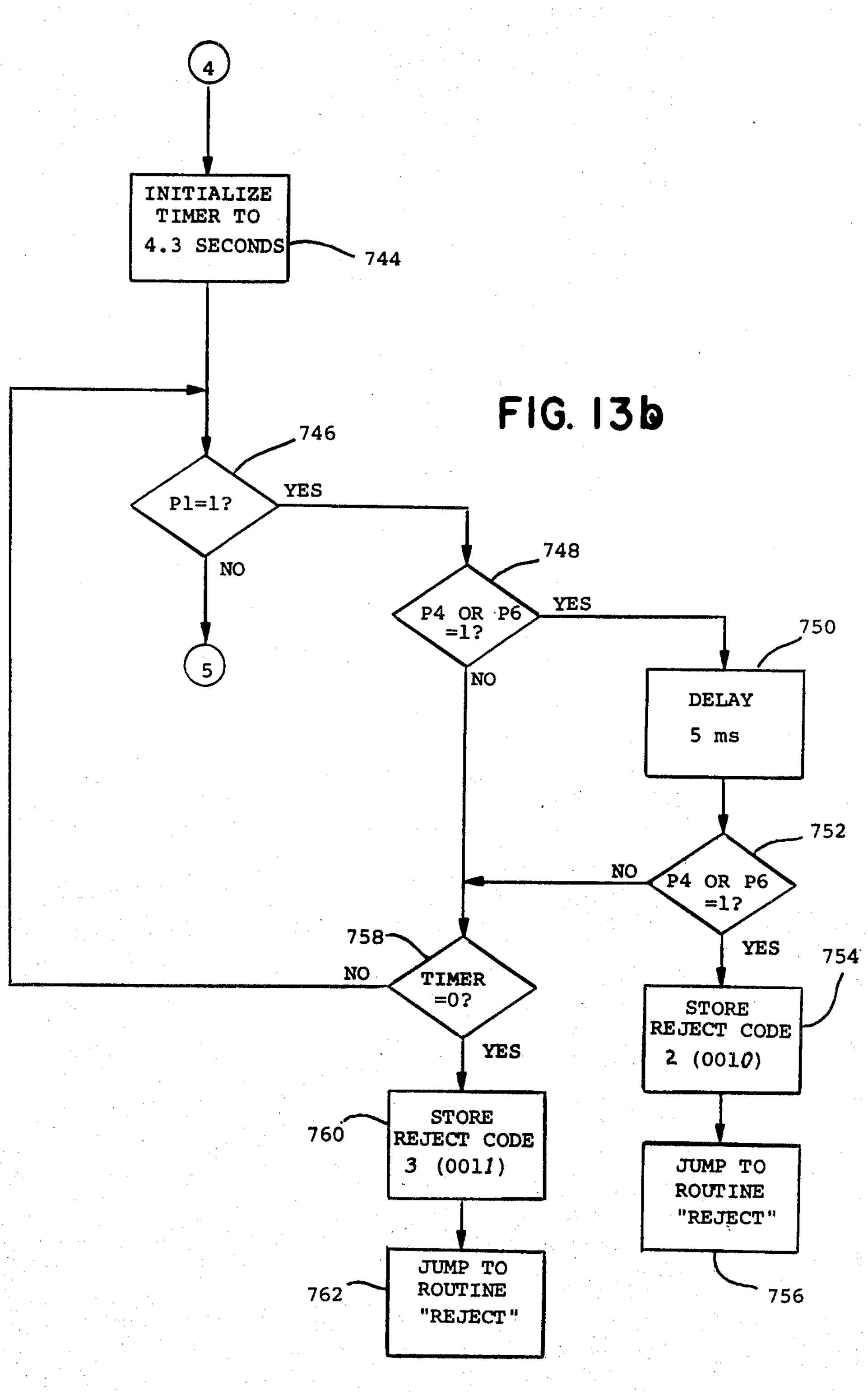
Figure 13C:
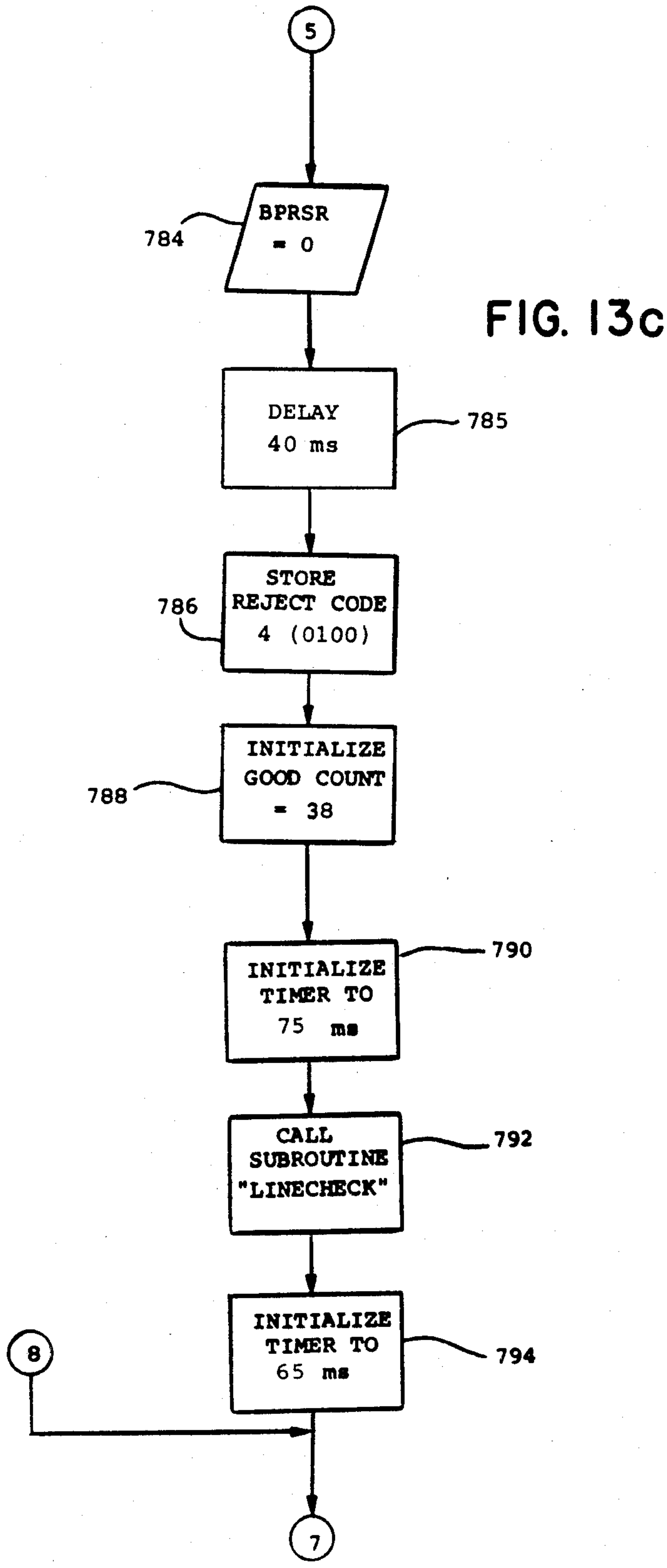
Figure 13D:
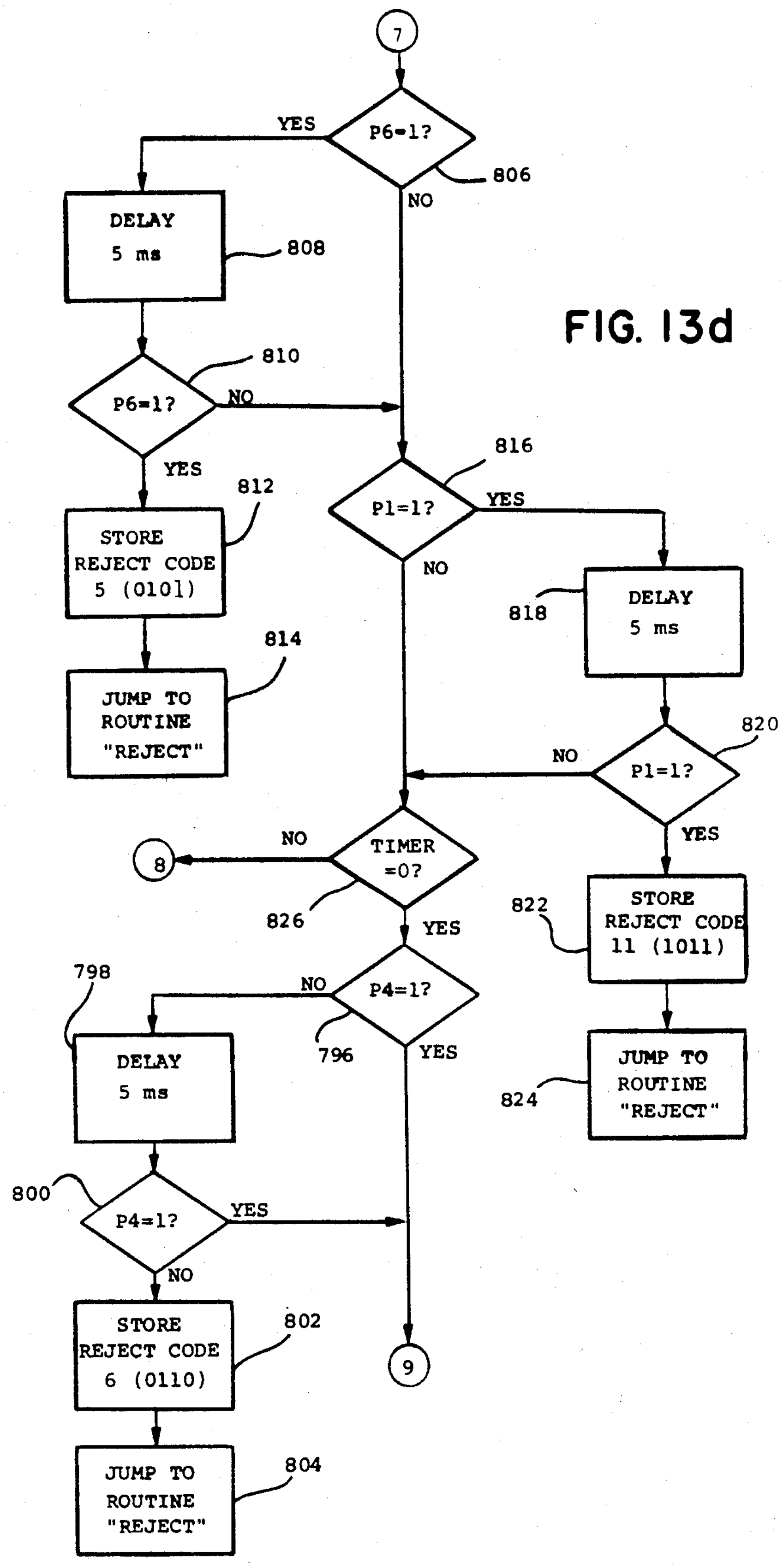
Figure 13E:
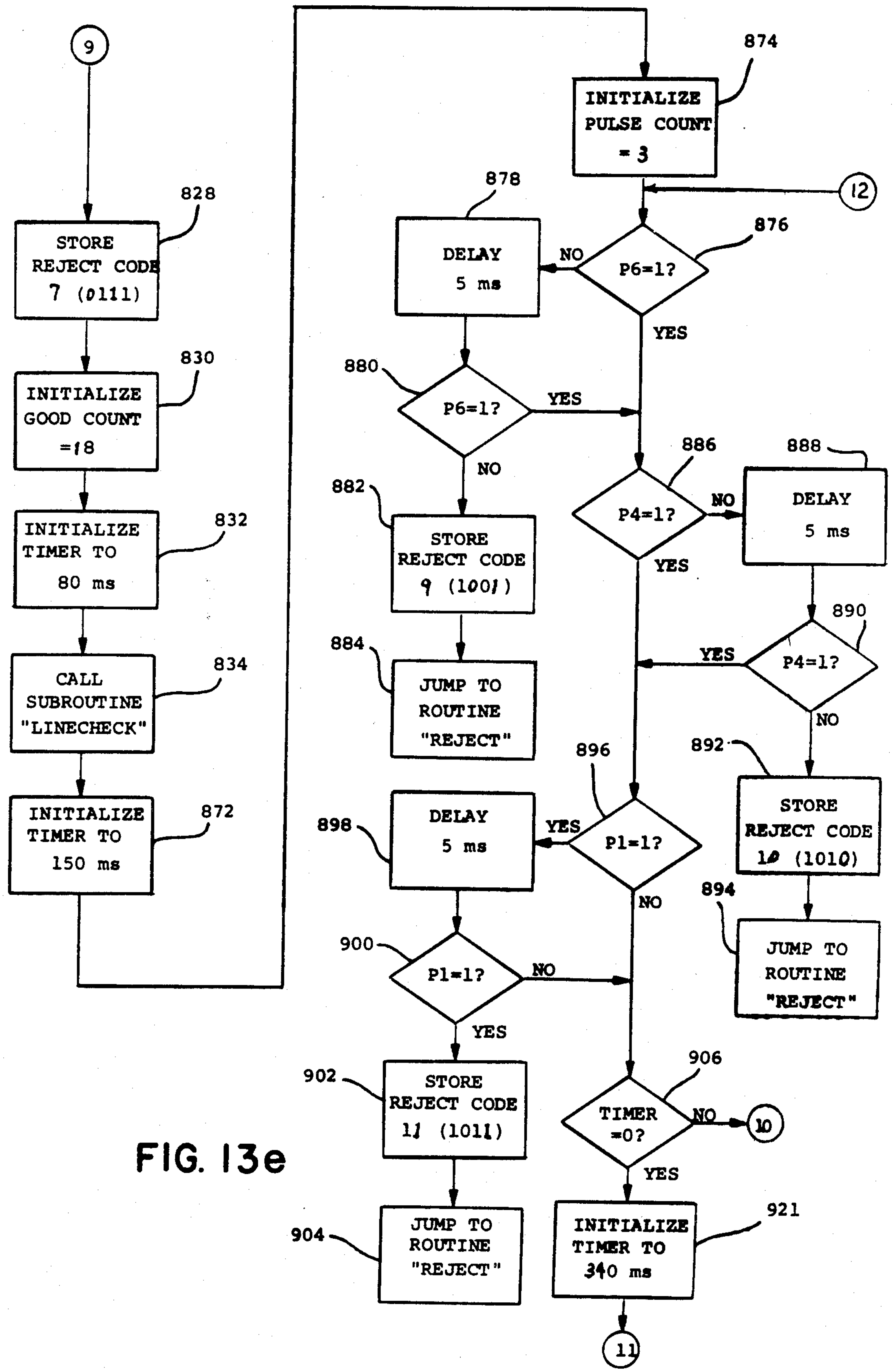
Figure 13F:
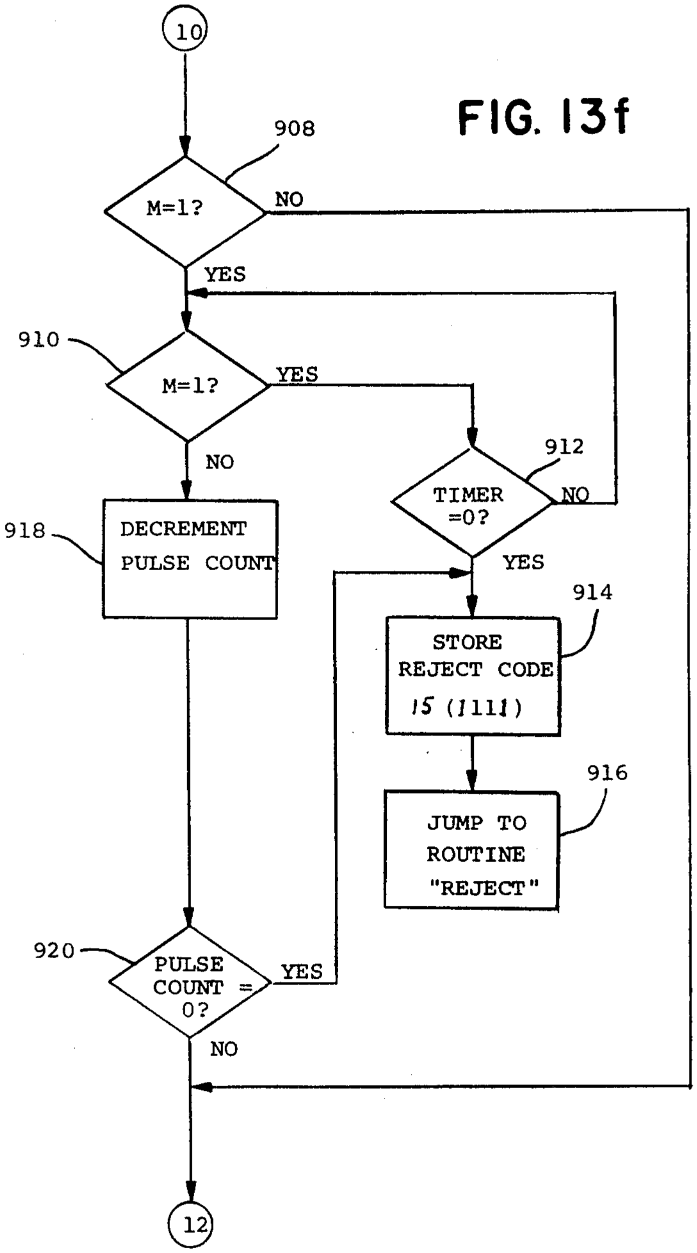
Figure 13G:
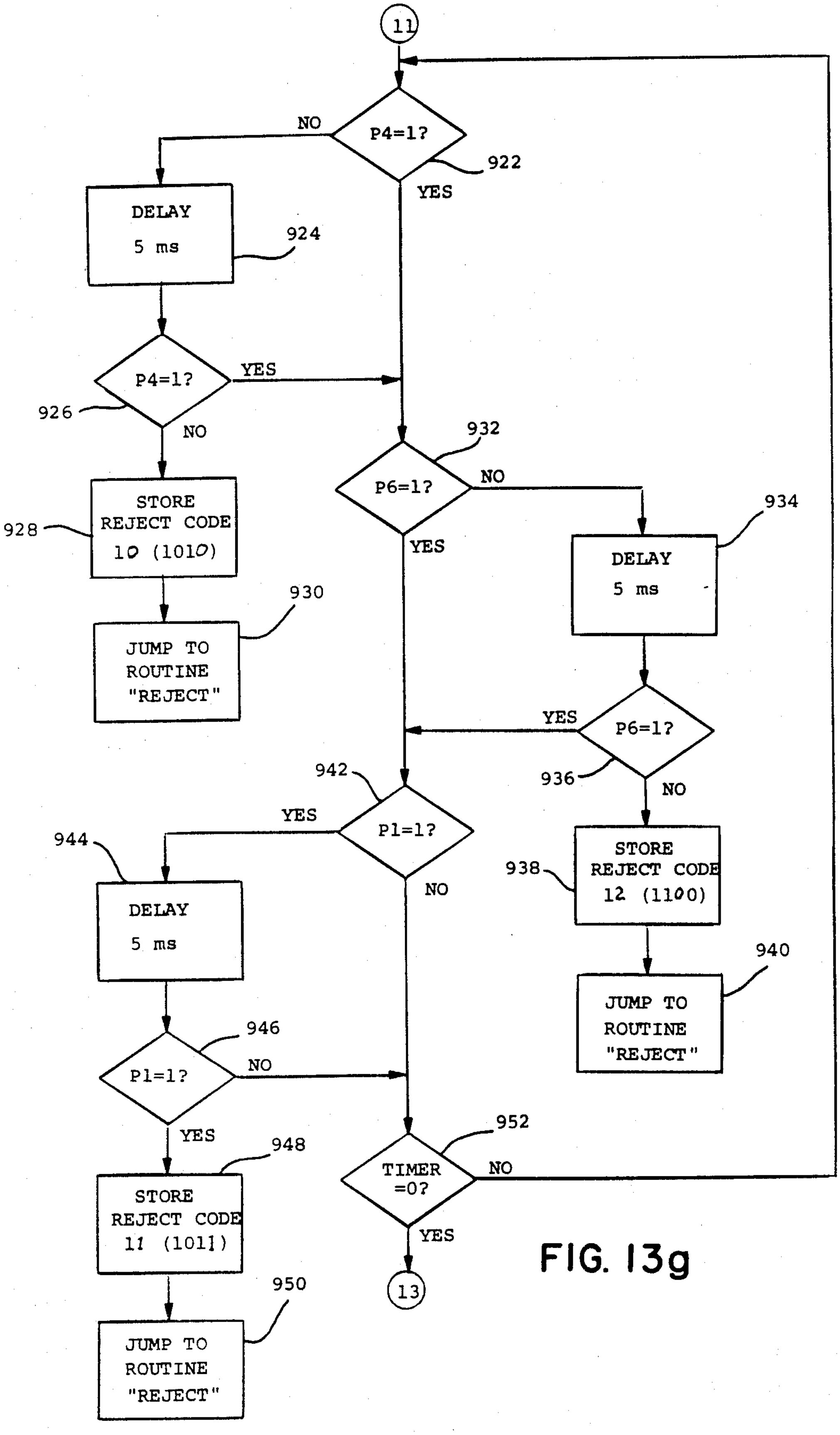
Figure 13H:
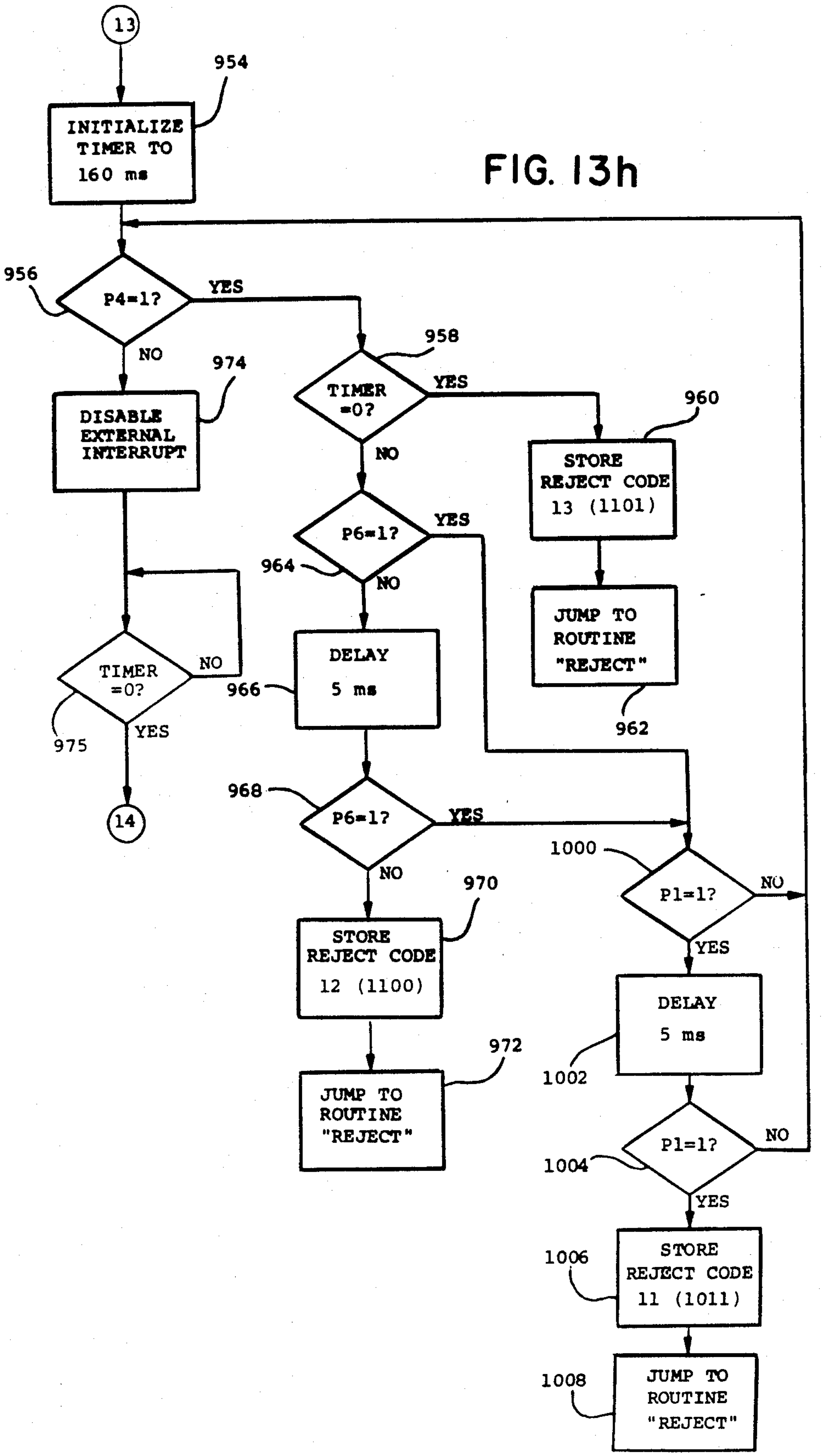
Figure 13I:
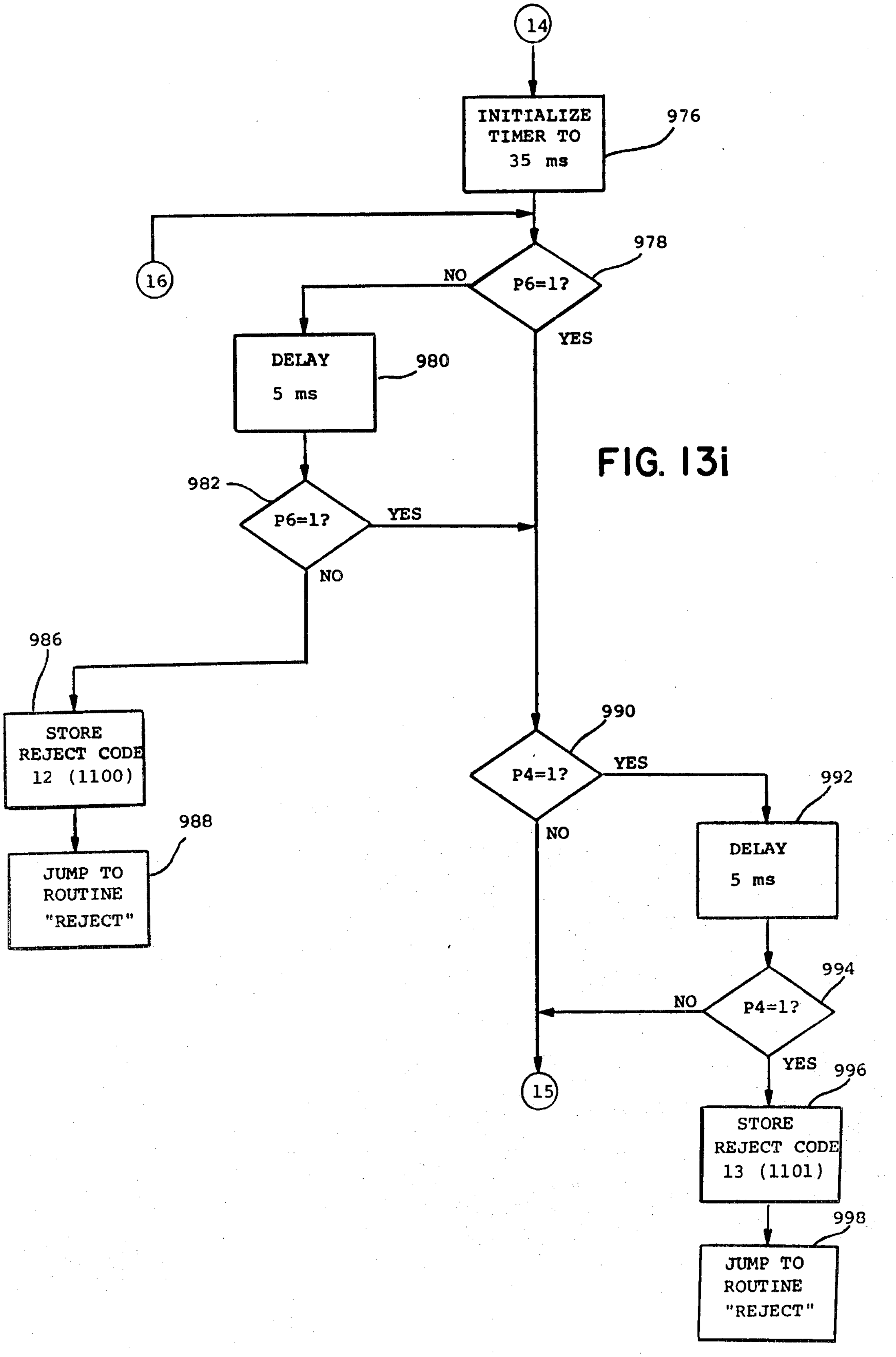
Figure 13J:
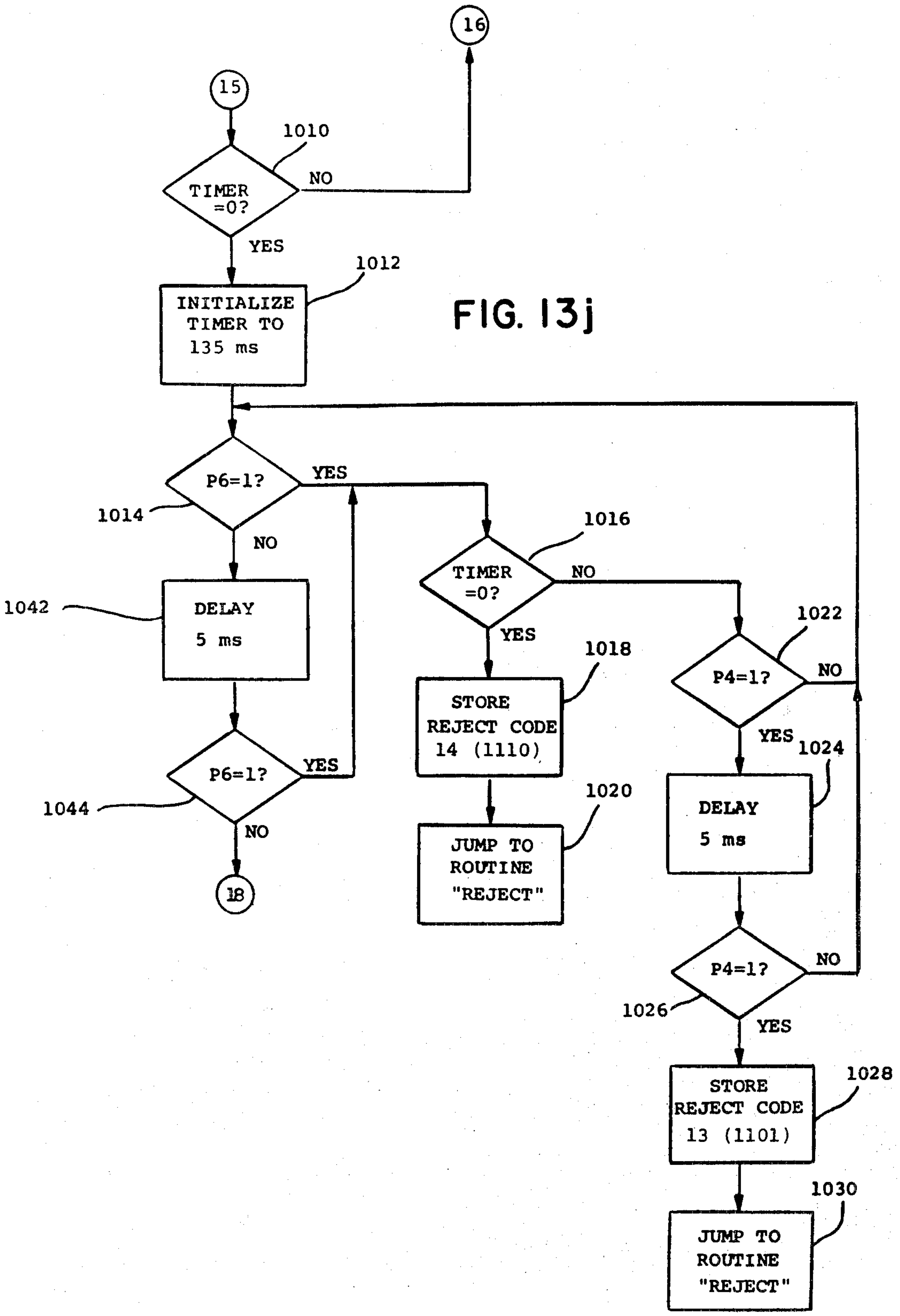
Figure 13K:
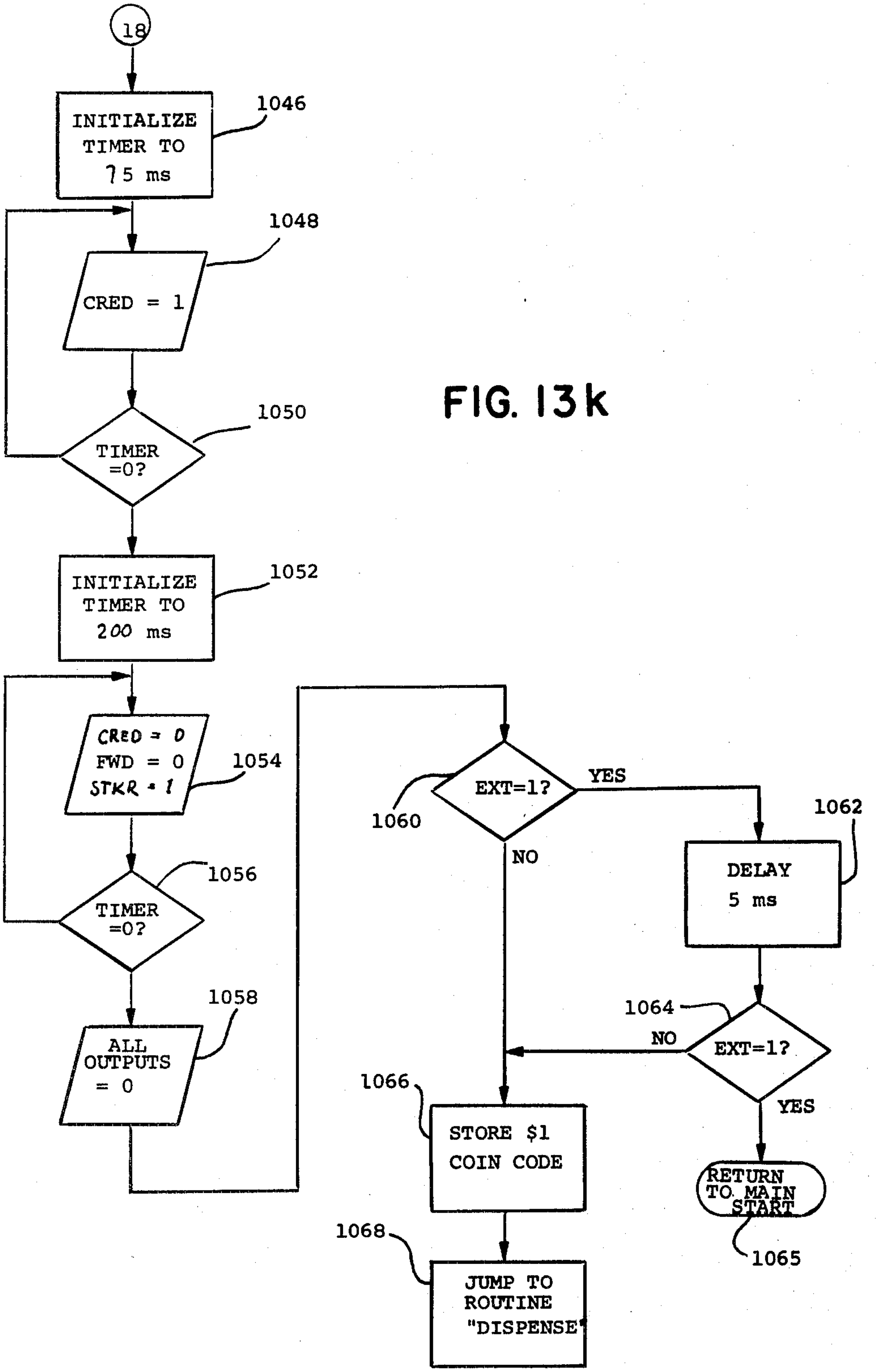
Figure 14:
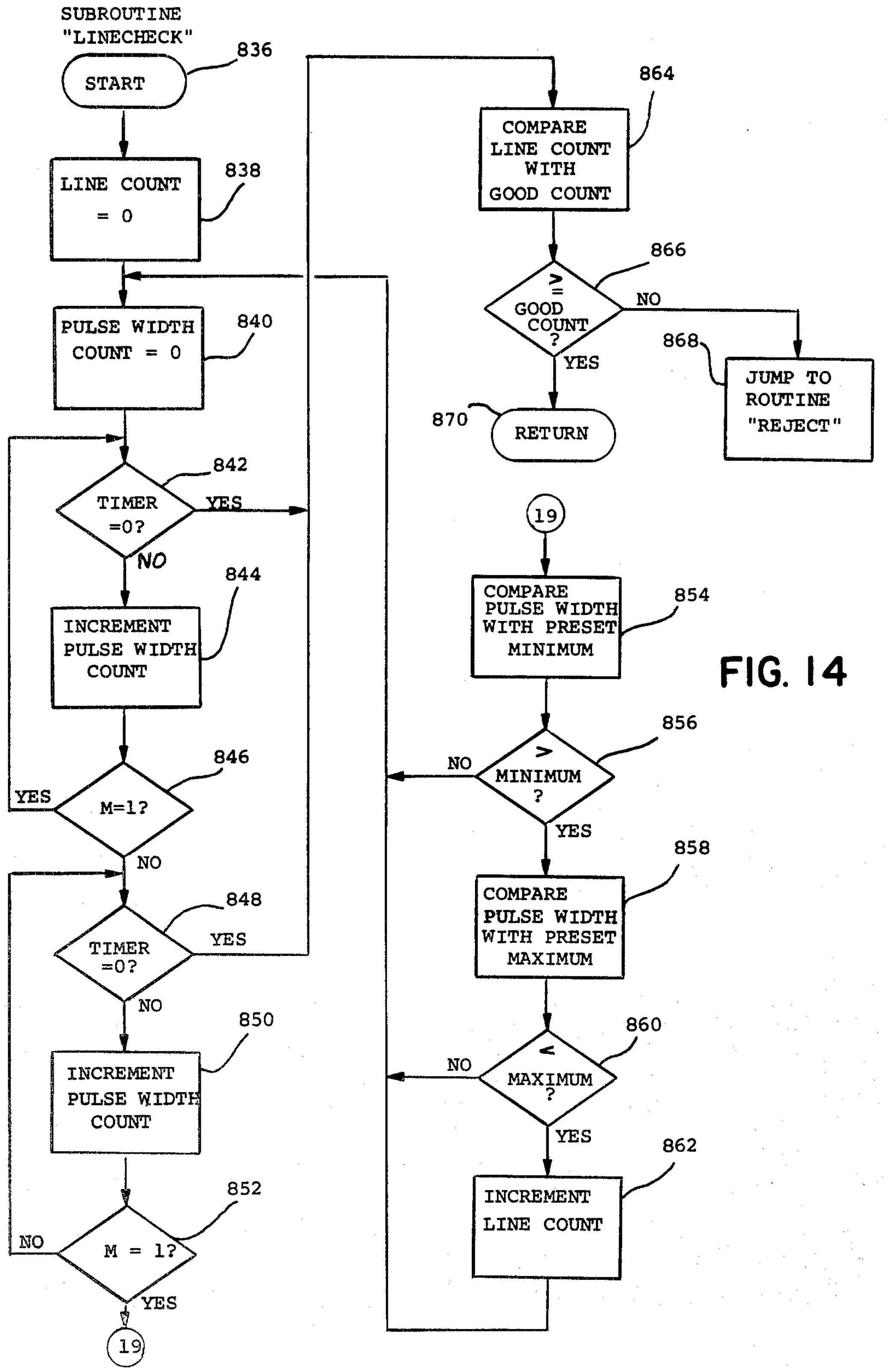

FIG. 14 is a flowchart of the line-checking subroutine of the bill-validating routine shown in FIGS. 13*a* to 13*k*.

Figure 15:
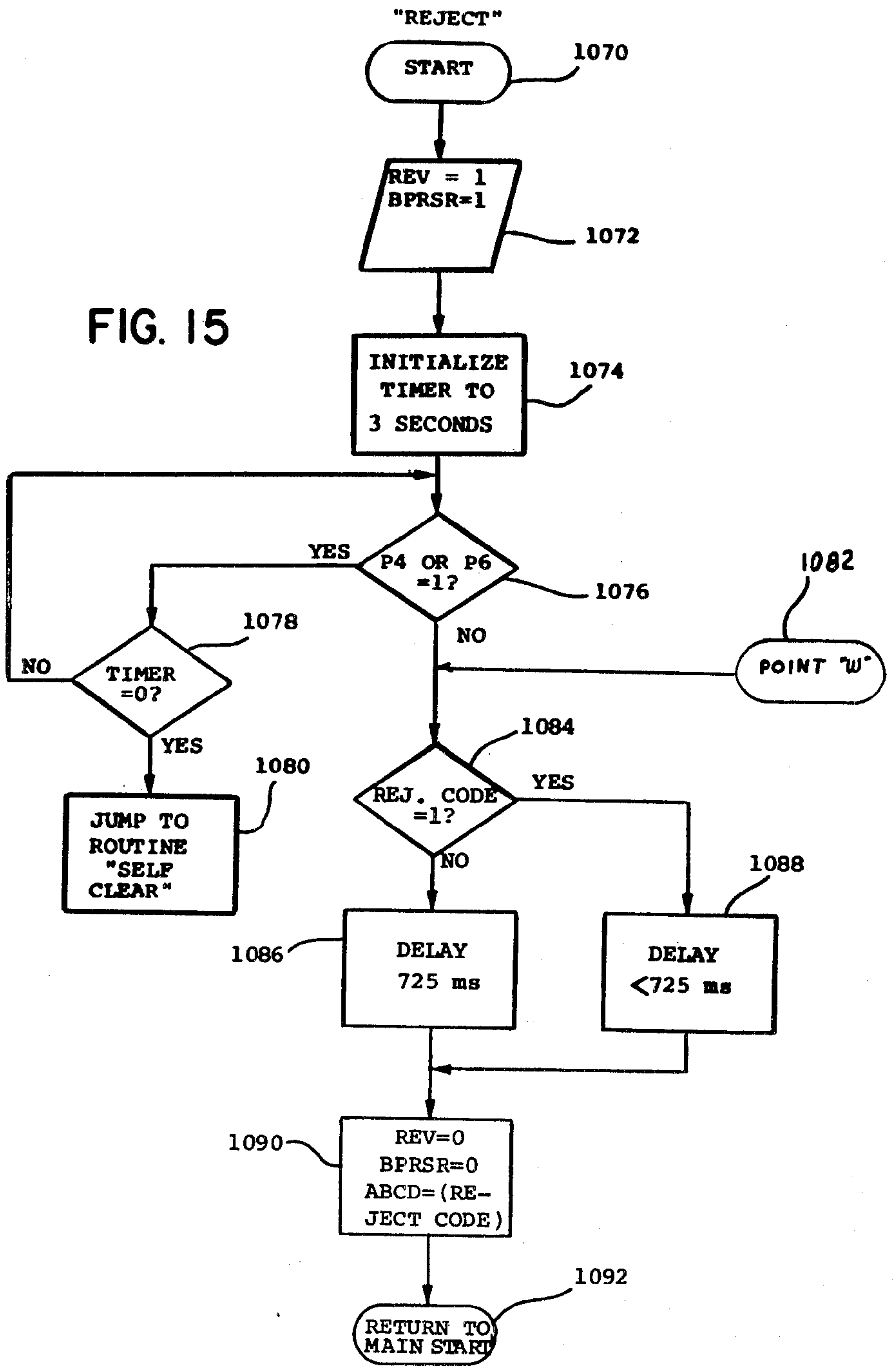

FIG. 15 is a flowchart of the bill-rejecting routine of the control circuit shown in FIGS. *2a* to *2c*.

Figure 16:
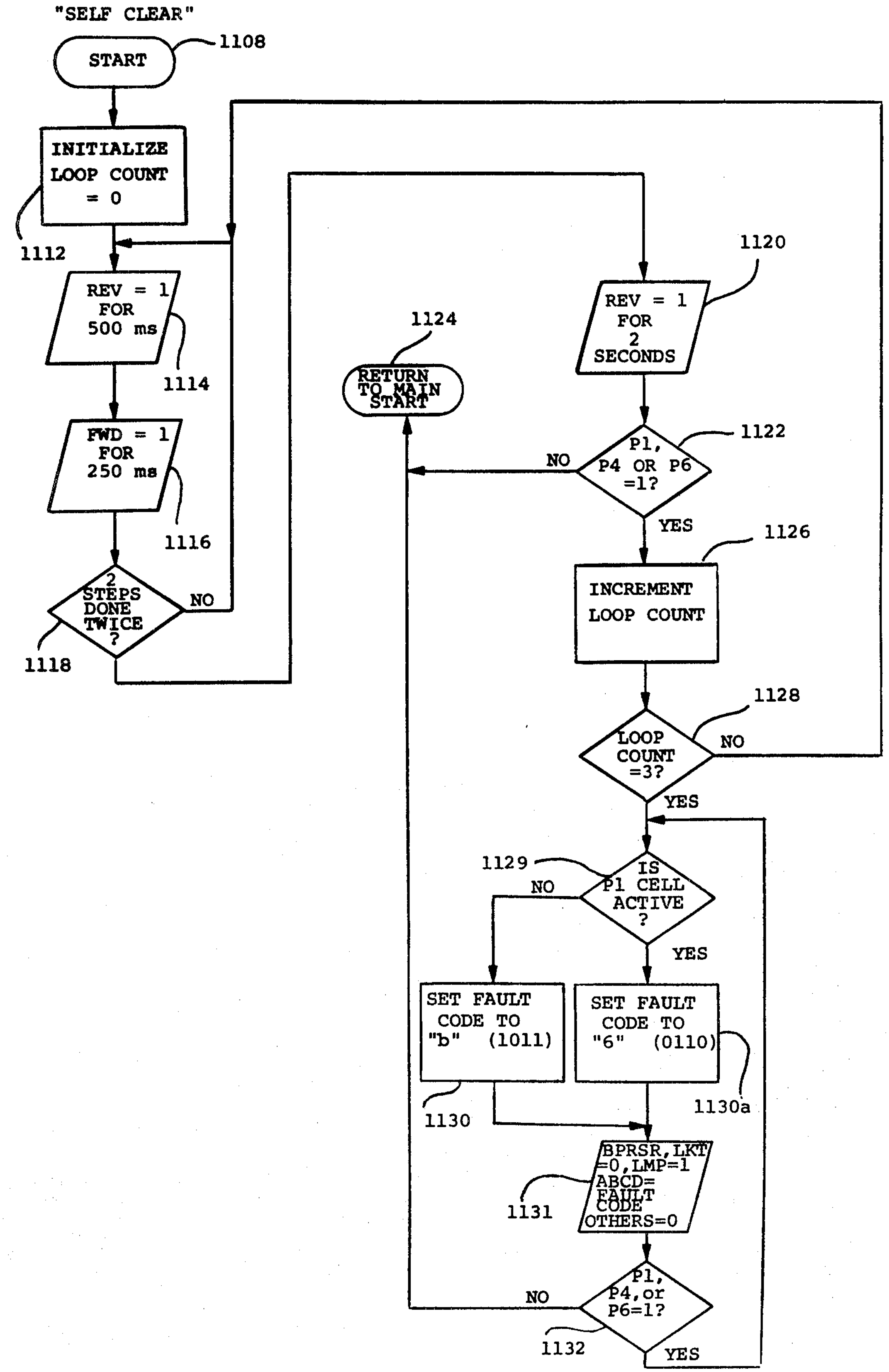
Figure 17A:
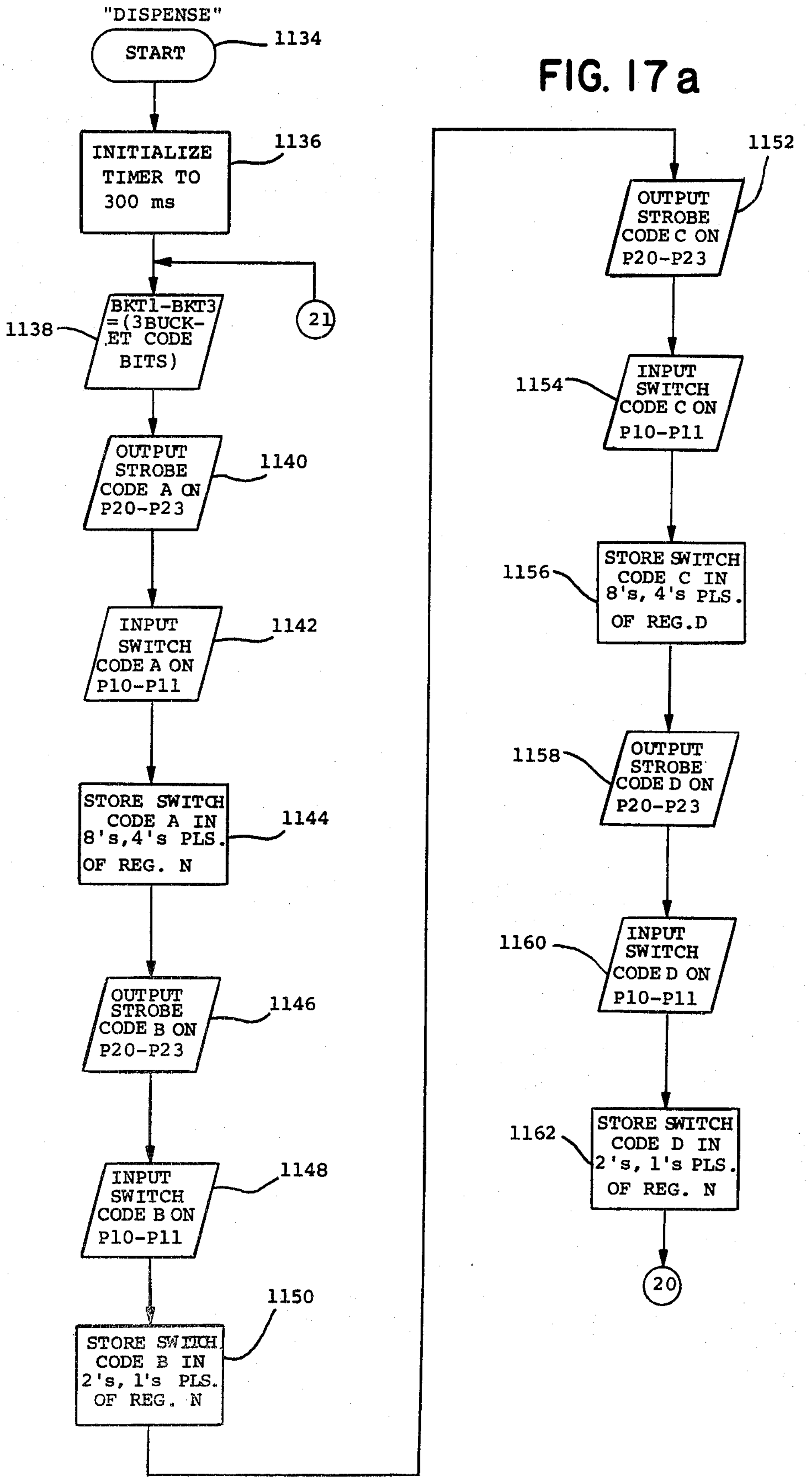
Figure 17B:
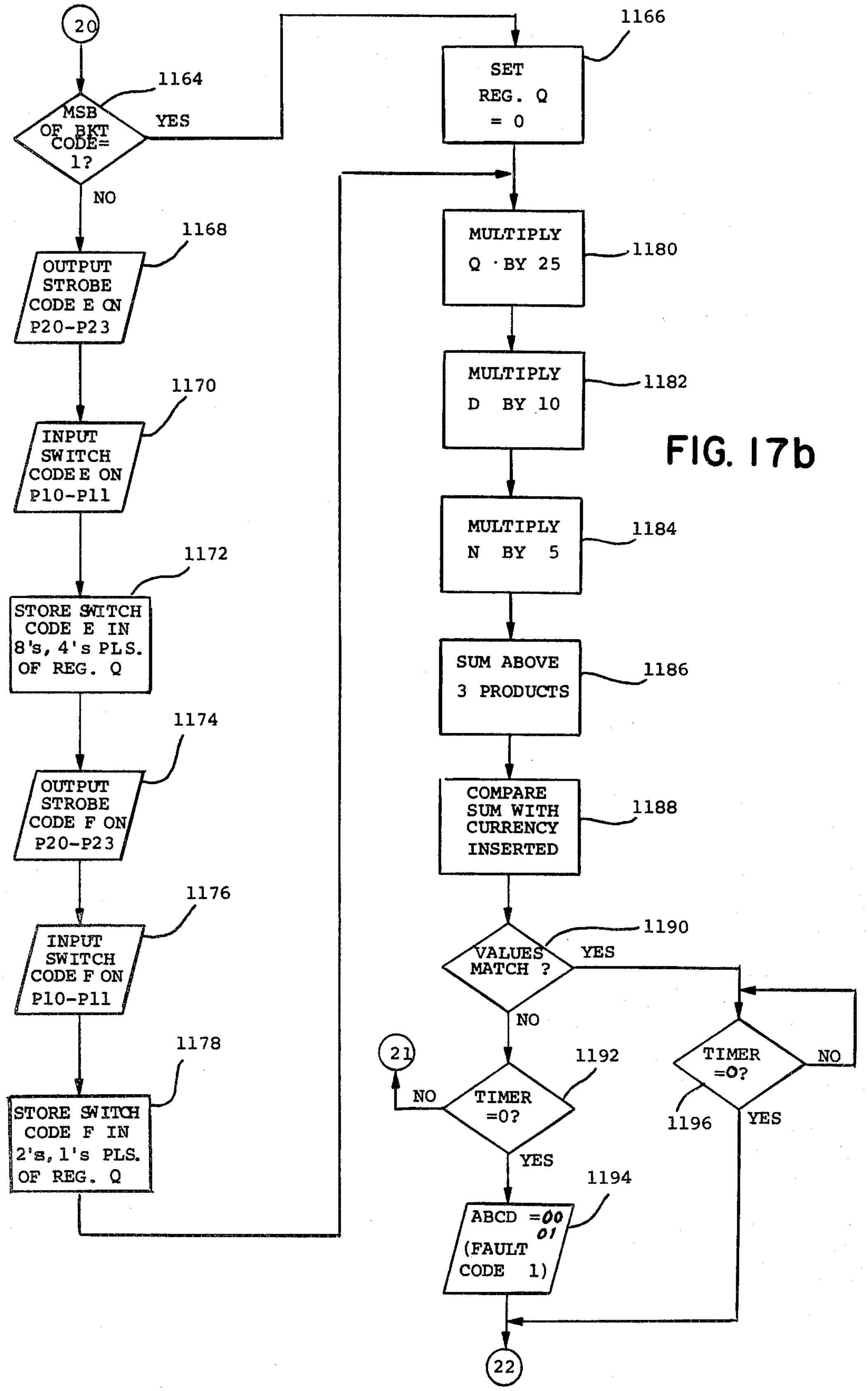
Figure 17C:
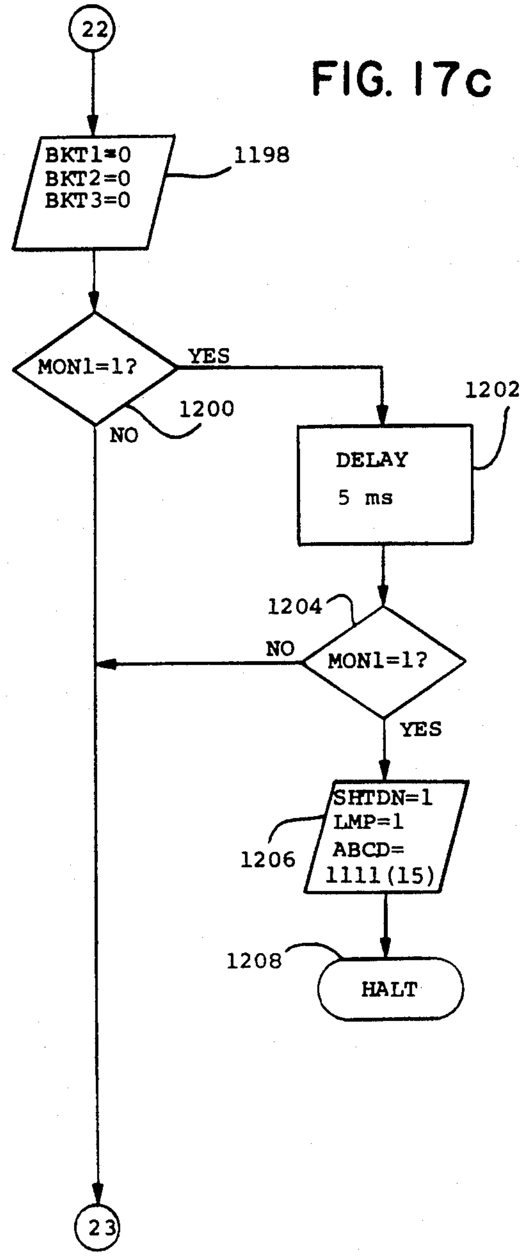
Figure 17D:
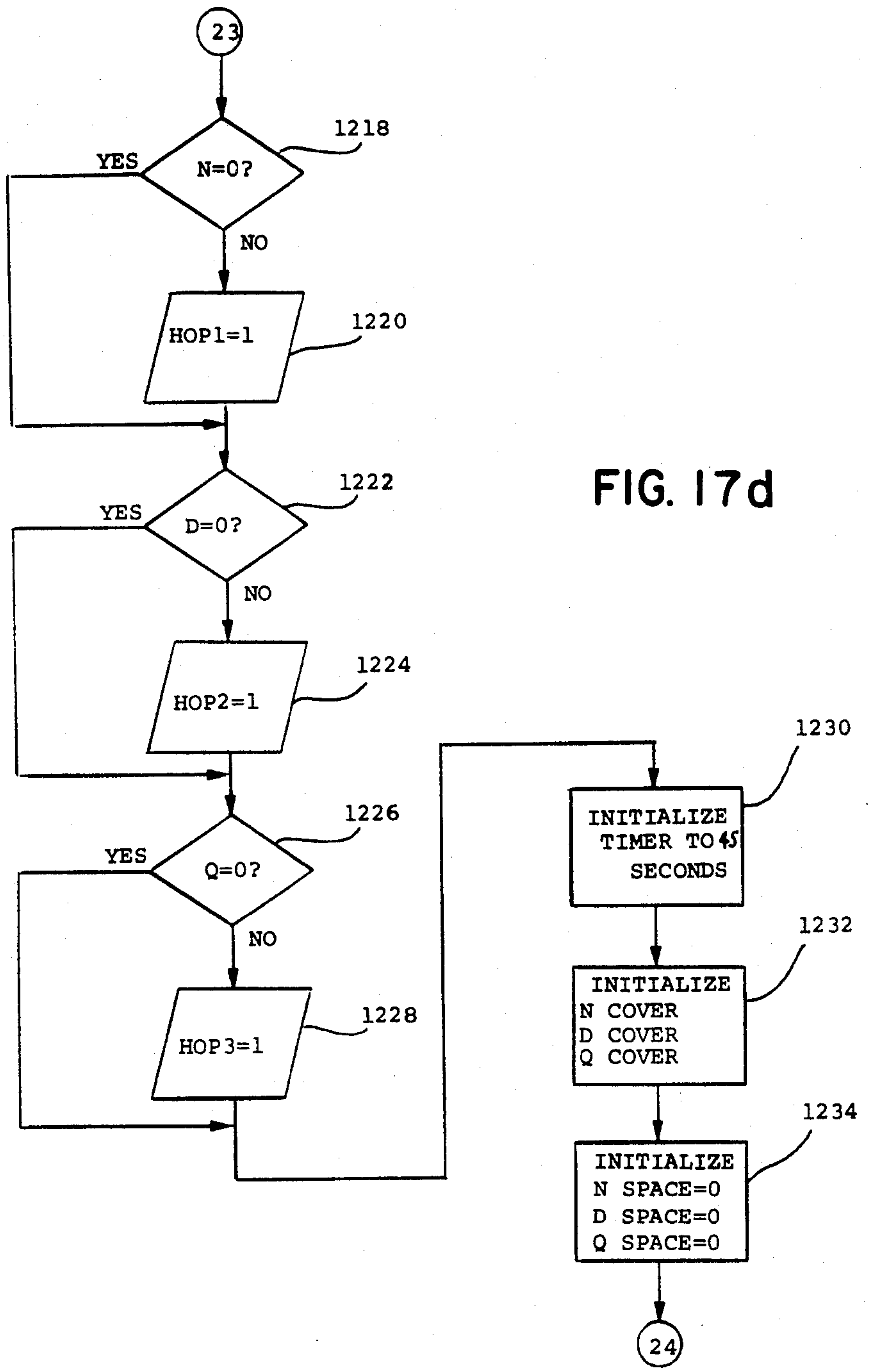
Figure 17E:
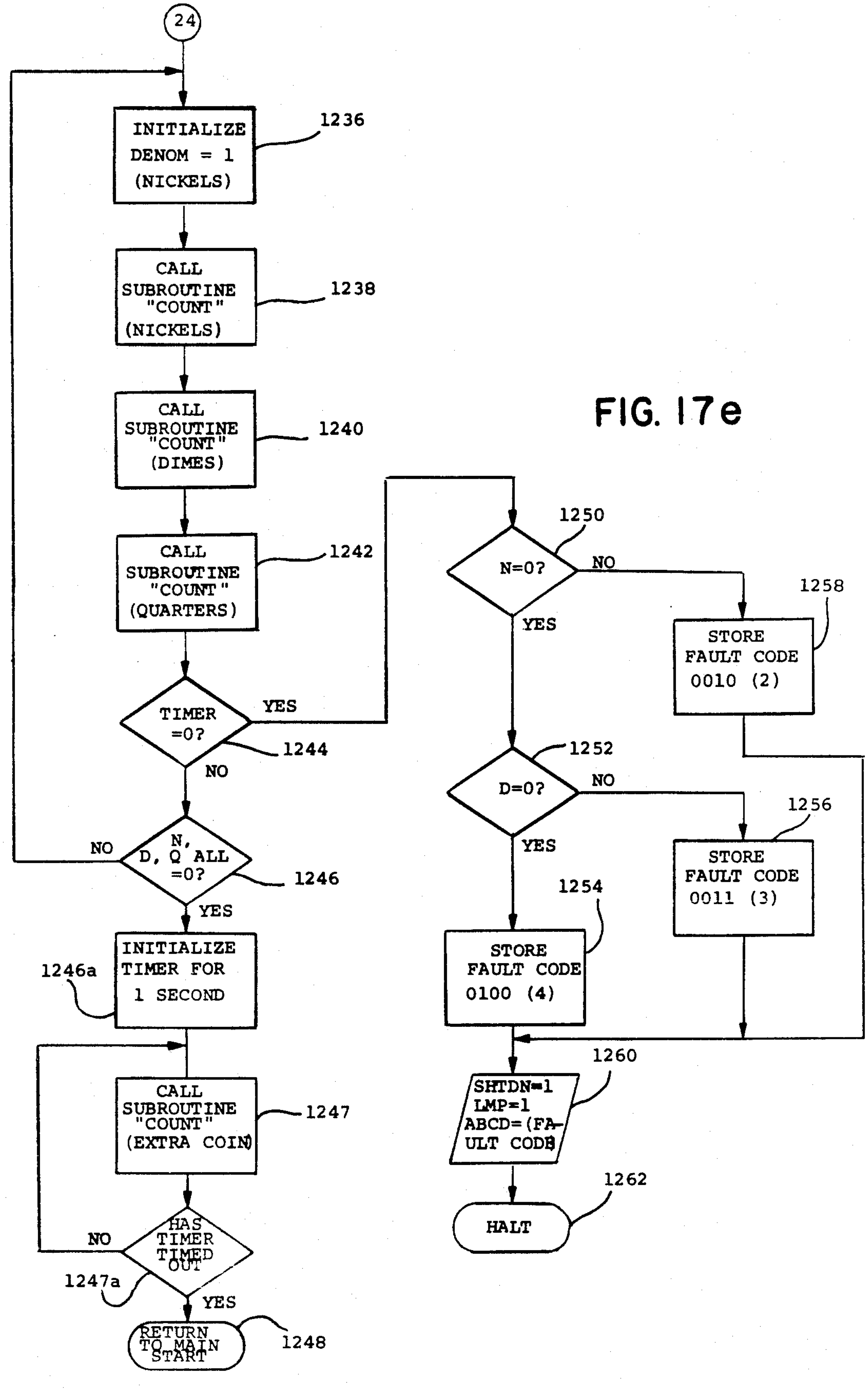

FIG. 16 is a flowchart of the track-clearing routine of the control circuit shown in FIGS. *2a* to *2c*.

Figure 2A:
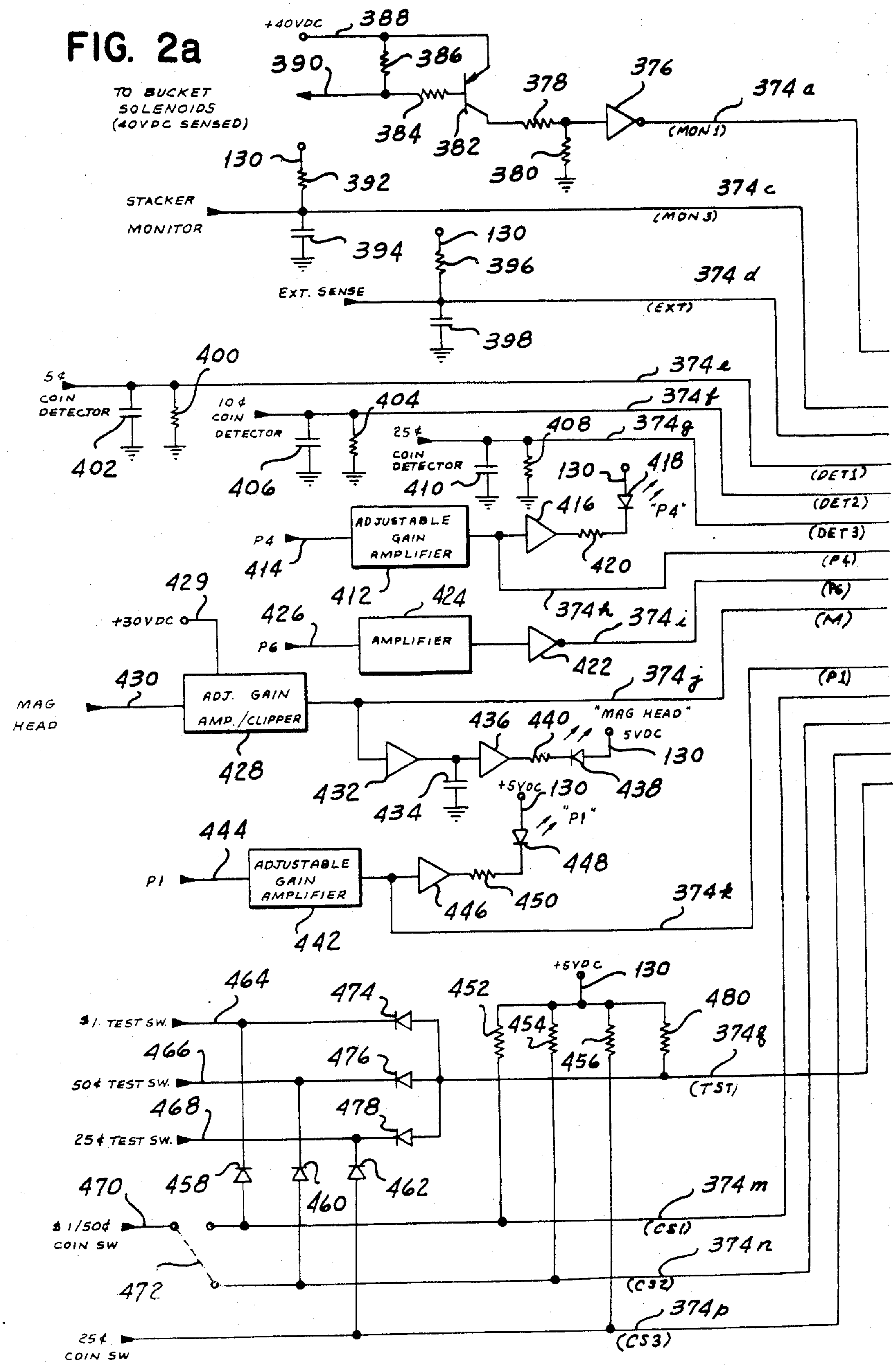
Figure 2B:
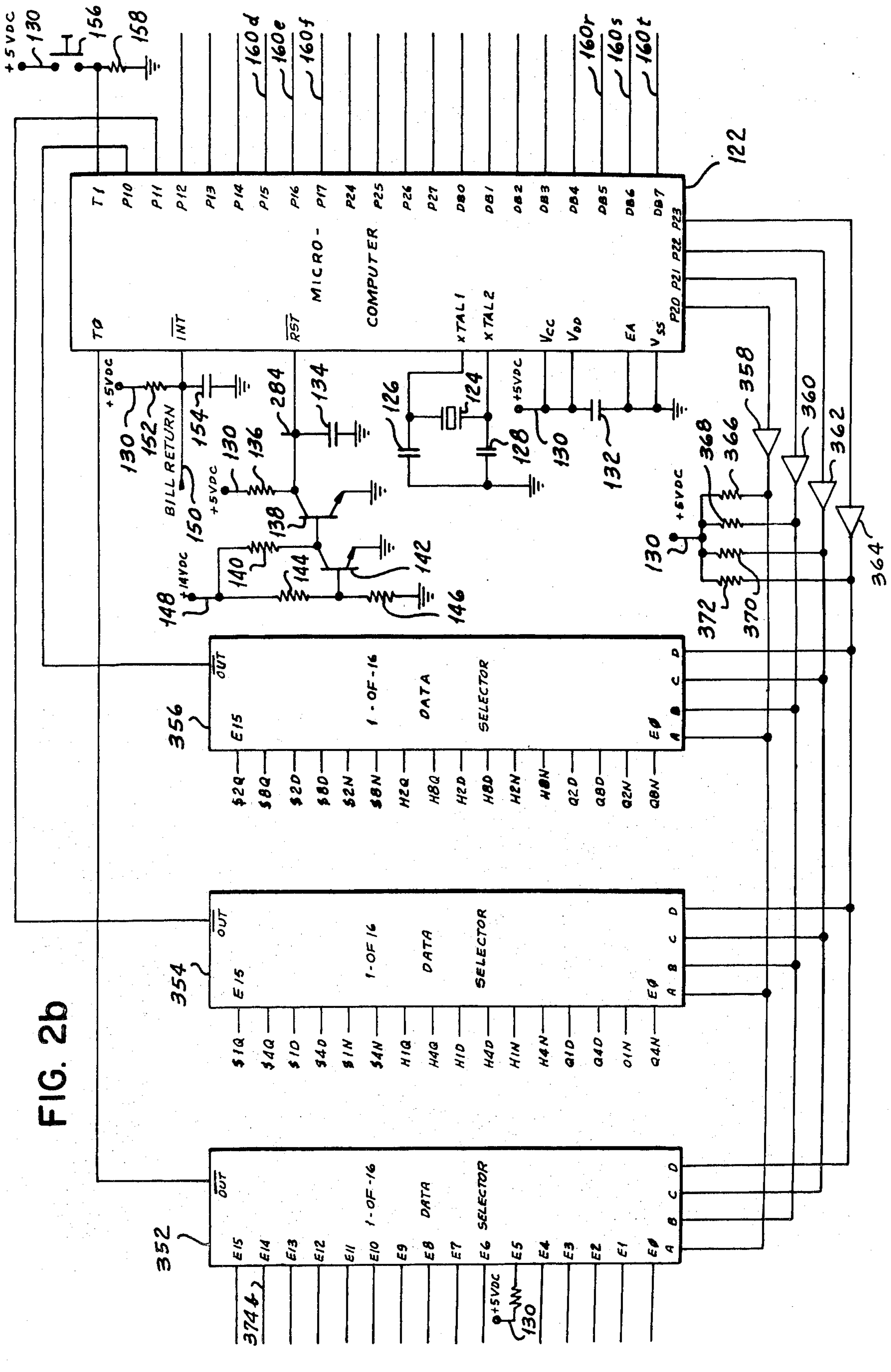
Figure 2C:
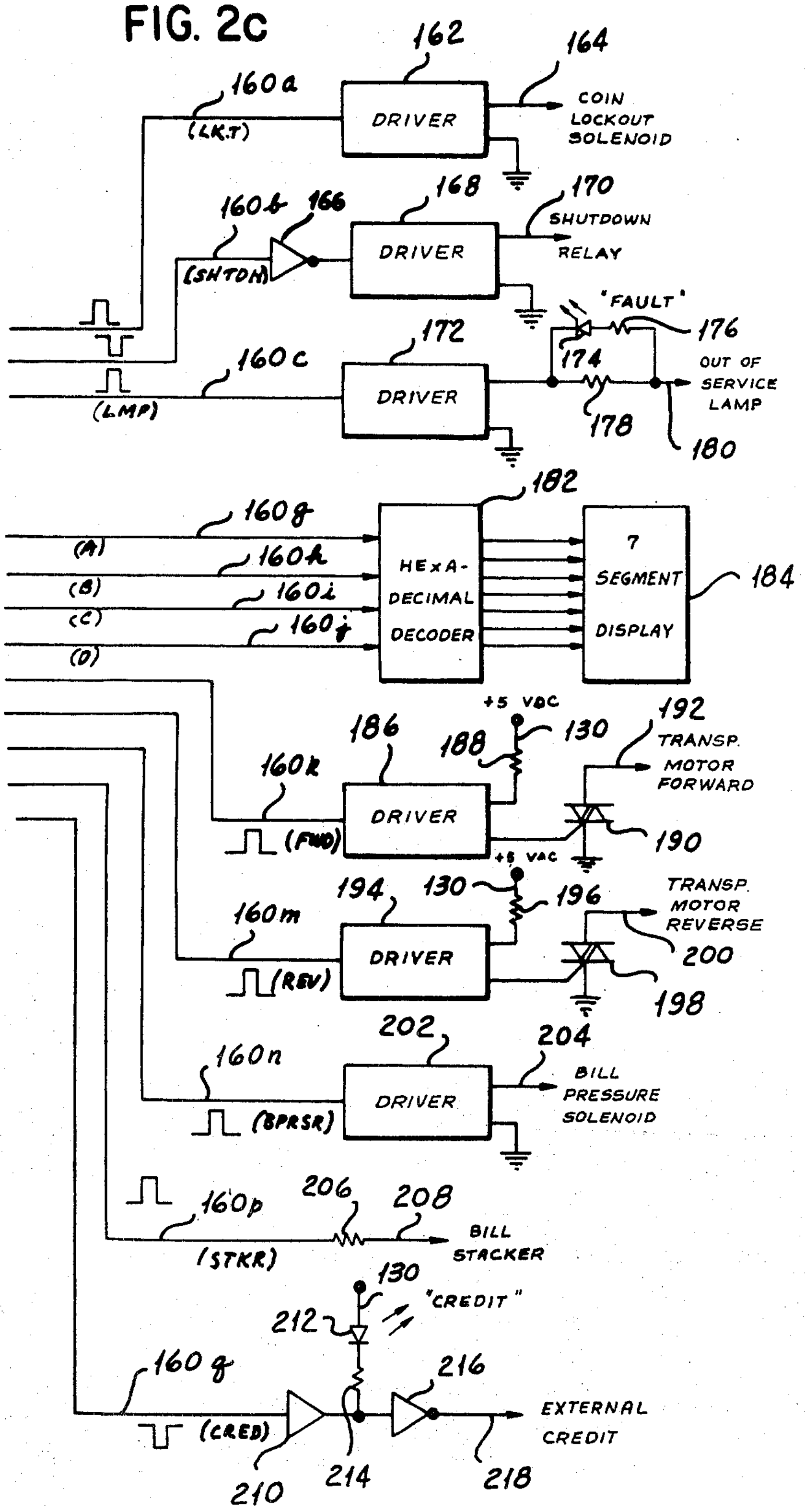

FIGS. 17*a* to 17*e* are a flowchart of the change-dispensing routine of the control circuit shown in FIGS. 2*a* to 2*c*.

Figure 18A:
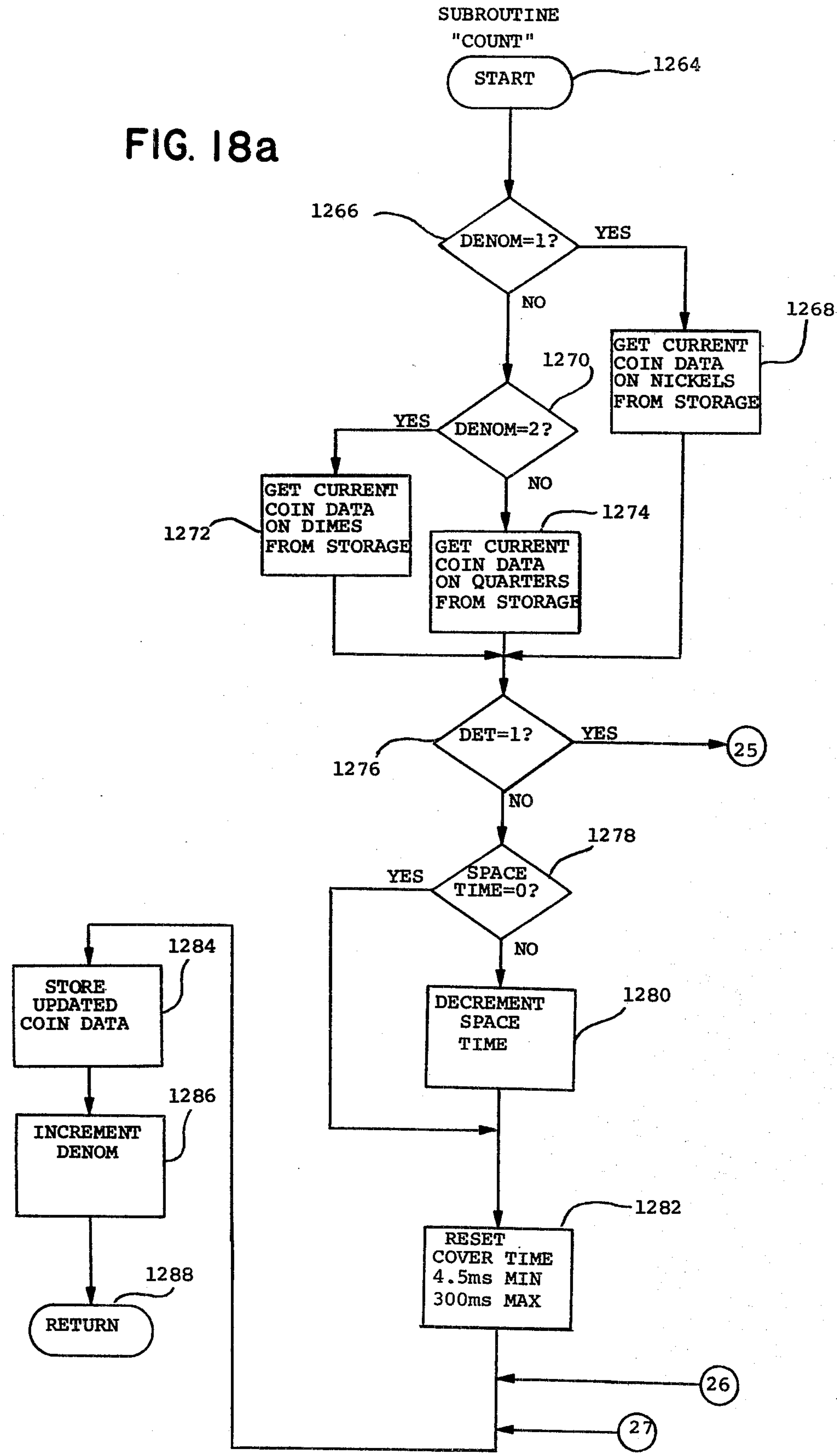
Figure 18B:
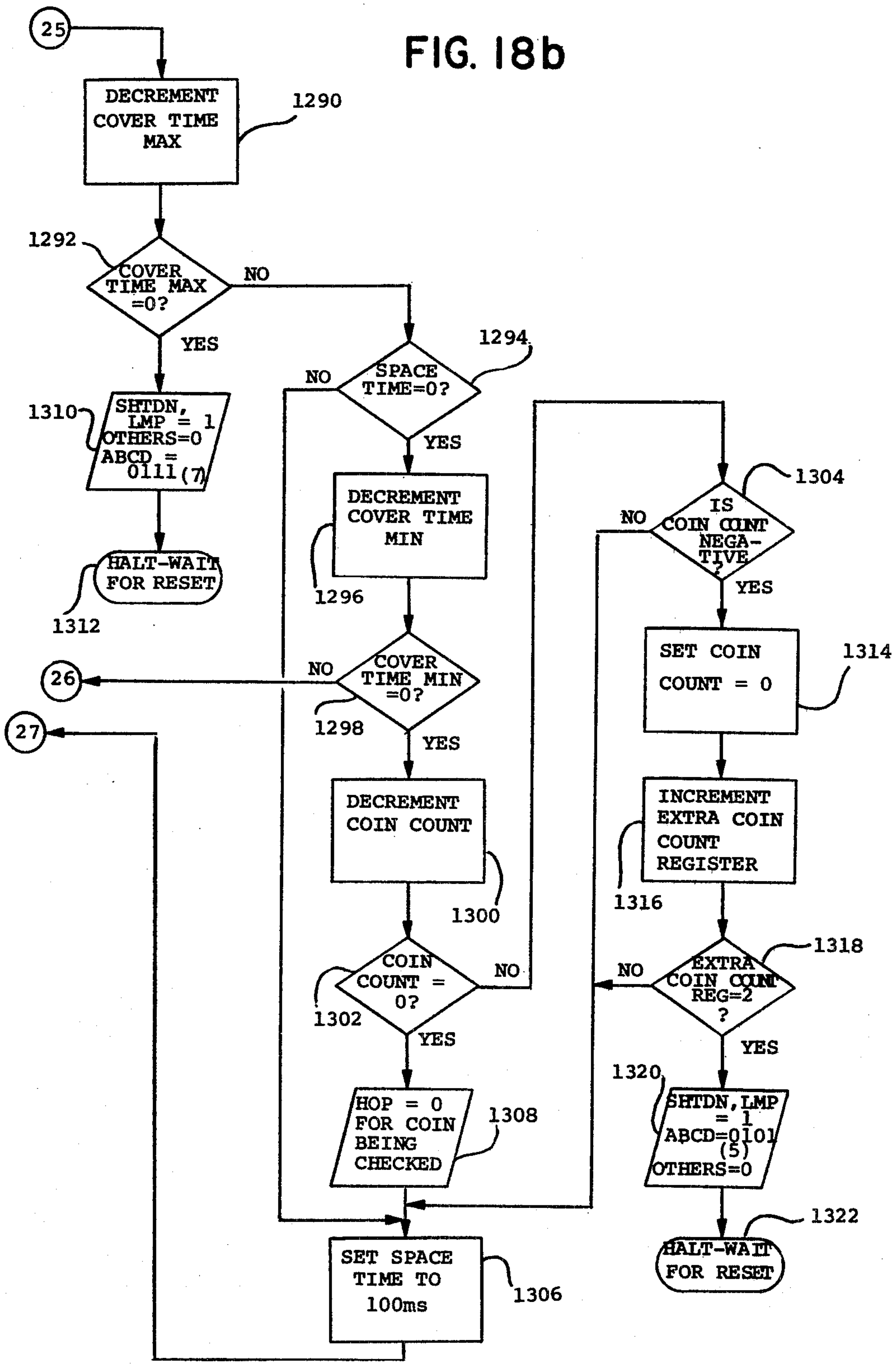

FIGS. 18*a* to 18*b* are a flowchart of the coin-counting subroutine of the change-dispensing routine shown in FIGS. 17*a* to 17*e*.

Figure 19:
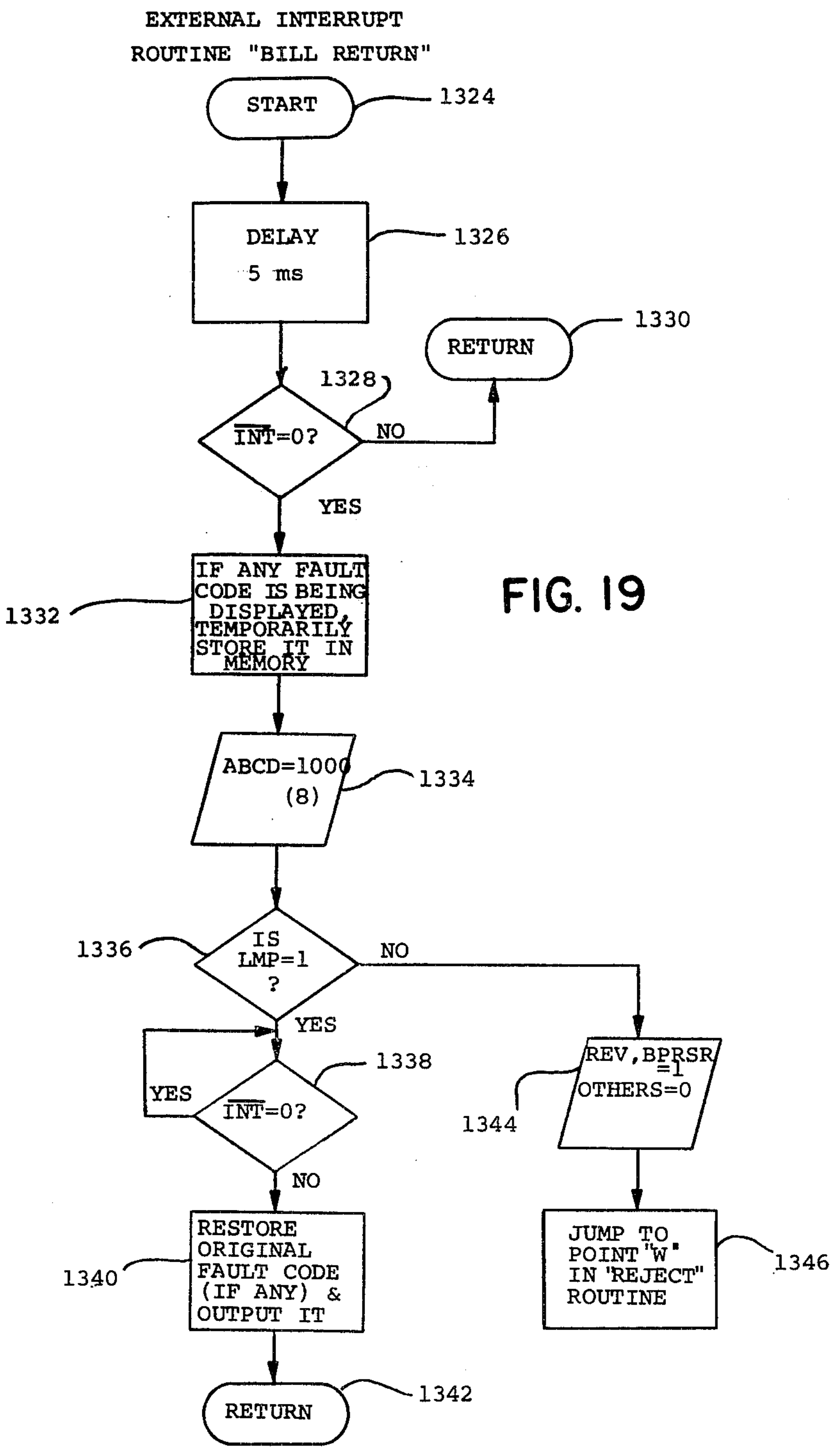

FIG. 19 is a flowchart of the manually actuated bill-returning routine of the control circuit shown in FIGS. 2*a* to 2*c*.

DESCRIPTION OF THE PREFERRED EMBODIMENT

Figure 1:
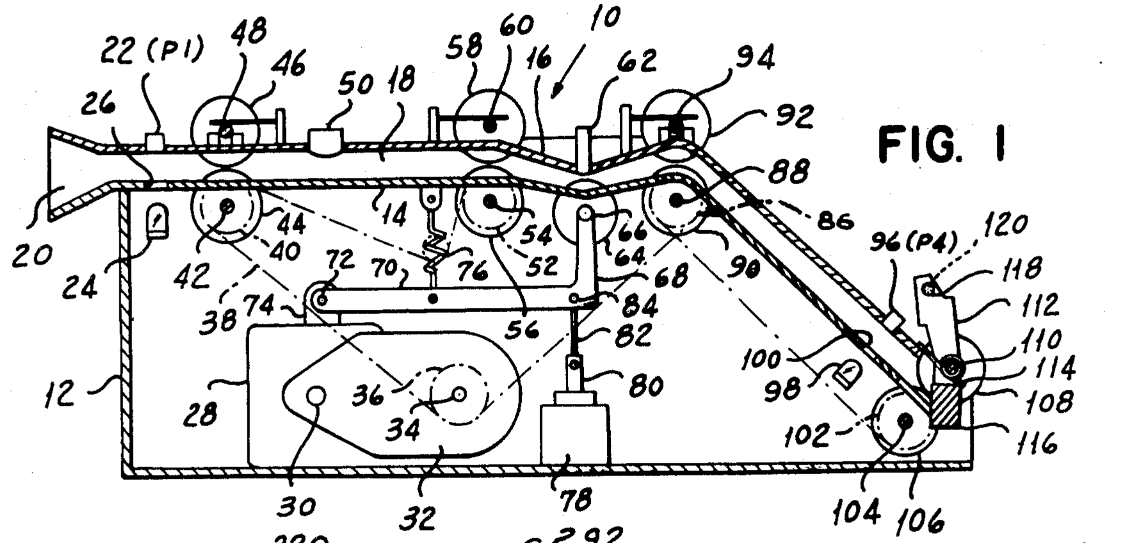
FIG. 1 is a section of the bill transport assembly of a bill and coin changer incorporating my invention.

Referring now to FIG. 1 of the drawings, a bill and coin changer incorporating my control circuit includes a bill transport assembly, indicated generally by the reference character 10. Assembly 10 includes a housing 12 carrying spaced lower and upper guides 14 and 16 forming a passage 18 into which a bill is introduced through a mouth 20 at the left end of the passage as viewed in the figure. A photocell 22 mounted in the upper guide 16 normally is illuminated by means of a lamp 24 casting light through an opening 26 in the lower guide 14. As will be more fully explained hereinbelow, as a bill is introduced into the passage 18 through the mouth 20 it interrupts the light from lamp 24 falling on photocell 22 to energize a drive motor 28 to drive in a forward direction to rotate a shaft 30 providing the input to a gear box 32. Motor 28 is preferably a synchronous motor but may be a low-slip induction motor so that the speed of the bill is accurately regulated at approximately 7.88 inches per second. The gear box 32 has an output shaft 34 carrying a sprocket wheel 36 which drives a pitch chain 38.

Chain 38 extends to a sprocket wheel 40 carried by a shaft 42 supported on the housing 12. Shaft 42 carries a number of spaced transport wheels 44 adapted to cooperate with upper idler wheels 46 carried by a shaft 48. As the bill enters into the nip between the wheels 44 and 46 it is carried along the passage 18 from left to right as viewed in FIG. 1. For proper operation of the acceptor the bill must be inserted face up with the portrait facing in the direction of movement of the bill. In the course of its movement along the passage 18 the bill passes under an anti-cheat magnet 50 supported in the upper guide.

Chain 38 extends around a sprocket wheel 52 carried by a shaft 54 supporting a number of spaced lower intermediate transport wheels 56. Wheels 56 cooperate with upper idler wheels 58 carried by a shaft 60 to continue the movement of the bill along the passage 18. As the bill moves along the passage past the wheels 56 and 58, areas thereof are scanned by a magnetic pickup head 62. The magnetic head 62 scans along a band which is centered at about 15/16 inch from the bottom of the bill and which passes through the neck of the portrait.

It will readily be appreciated that the head 62 is made sufficiently wide so that correct predetermined regions of the bill are scanned. In my bill acceptor, I ensure that the head sequentially scans the neck region and then the serial number and Federal Reserve seal region of the bill. A pressure roller 64 disposed below the head 62 is carried by a shaft 66 which is supported on one arm 68 of a bell crank having a second arm 70, the end of which is supported on a pivot pin 72 carried by a bracket 74 on the housing 12. A spring 76 connected between the arm 70 and the lower guide 14 normally biases the lever arm to urge the pressure roller 64 upwardly into the passage 18 so as to press a bill firmly into engagement with the sensing head 62. A solenoid 78 has an armature 80 connected by a rod 82 to a pivot pin 84 on the lever arm 70. Solenoid 78 is adapted to be energized in a manner to be described below to move the pressure roller 64 away from the head 62.

Chain 38 extends around a sprocket wheel 86 carried by a shaft 88 supported on the housing 12. Shaft 88 carries a plurality of spaced lower transport rollers 90 which cooperate with upper idler rollers or wheels 92 carried by a shaft 94. As the bill leaves the wheels 90 and 92 it moves along a portion of the passage 18 extending downwardly and to the right as viewed in FIG. 1. A photocell 96 mounted in the upper guide 16 normally is illuminated by a lamp 98 which throws light through an opening 100 in the lower guide 14. As the leading edge of the bill arrives at the opening it interrupts the light from lamp 98 to photocell 96.

Chain 38 also is coupled to a sprocket wheel 102 carried by a shaft 104 supported on housing 12 at the lower right-hand end of guide 14. Shaft 104 carries a plurality of spaced transport wheels 106 which cooperate with idler wheels 108 carried by a shaft 110 at the lower end of the upper guide 16.

Shaft 110 carries a lever arm 112 the lower end of which is disposed in the path of bills emerging from the nip between wheels 106 and 108. A spring 114 on shaft 110 is biased between the lower edge of the upper guide 16 and a boss 116 on the lever 112 normally to position the lower end of the lever in the path of the emerging bill. The upper end of the lever 112 normally is positioned in the space between a photocell 118 and a lamp 120. As the bill emerges from the nip between rollers 106 and 108 it activates the arm 112 to move the upper end thereof against the action of spring 114 out of the space between photocell 118 and lamp 120 so that light from the lamp is permitted to fall onto the photocell.

It will be apparent to those skilled in the art that the positions of photocell 22 and lamp 24, as well as the positions of photocell 96 and lamp 98, could be transposed. Further, if lamp 98 is disposed above rather than below the passage 18, lamp 120 may, if desired, be eliminated and photocell 118 mounted in such a position as to receive light from lamp 98 when a bill engages arm 112.

Referring now to FIGS. 2*a* to 2*c*, the control system of my bill and coin changer includes a microcomputer 122 such as the 8048 microcomputer available from Intel Corporation of Santa Clara, Calif. 95051. The operation and pin configuration of microcomputer 122 are described in detail in the Intel user's manual entitled *MCS*-48 *Family of Single Chip Microcomputers* (1978). Although a microcomputer having an integral data and program memory is used in the system described, it will be apparent to those skilled in the art that my control system can also be implemented using any suitable microprocessor and external program and data memories. To provide a suitable timing source for the microcomputer 122, I couple a crystal 124 having a resonant frequency of approximately 3.58 MHz across the crystal oscillator inputs XTAL1 and XTAL2 of the microcomputer. Respective capacitors 126 and 128 provide paths between the crystal oscillator inputs and ground. I couple the main power supply pin $V_{cc}$ and the programming power supply pin $V_{dd}$ to a line 130 providing a 5 volt DC potential, while I couple the external access input $\overline{EA}$ and the ground pin $V_{ss}$ to ground. I connect a bypass capacitor 132 between the power supply inputs and ground.

I so couple the reset pin $\overline{RST}$ of the microcomputer 122 that loss of voltage either on the 5 volt line 130 or a 14 volt line 148 will cause the microcomputer 122 to reset itself. More particularly, I connect the 14 volt line 148 to the base of an NPN transistor 142 through a voltage divider circuit comprising resistors 144 and 146 and to the collector of transistor 142 through a load resistor 140. The emitter of transistor 142 is grounded, while the collector drives the base of a second NPN transistor 138. I couple the collector of transistor 138 to the 5 volt line 130 through a load resistor 136 and to the reset input $\overline{RST}$ of microcomputer 122 directly. A timing capacitor 134 connects the reset input to ground. Normally, the transistor 142 is saturated while transistor 138 is cut off. If, however, because of a lower power line voltage the potential on line 148 should drop below a certain value, transistor 142 will begin to cut off, causing the collector potential to rise to a high value and render transistor 138 conductive. As a result, the collector potential of transistor 138 drops to a low level to cause the microcomputer 122 to reset. Similarly, a loss of voltage on 5 volt line 130 will directly result in a loss of voltage at the reset pin, with the same effect.

To allow the bill and coin changer to be placed in a bill-returning mode, I couple the interrupt pin $\overline{INT}$ of the microcomputer 122 to a "bill return" line 150 which is grounded when the coin return button (not shown) of the changer is depressed. A pull-up resistor 152 and a bypass capacitor 154 connect line 150 respectively to the 5 volt DC line 130 to maintain line 150 normally at a high potential, and to ground. I also provide an external reset by inserting a normally open push-button switch 156 between a test input pin T1 and the 5 volt line 130. A resistor 158 normally maintains the pin T1 at ground potential. Switch 156 is actuated by the serviceman to restore the bill and coin changer after a fault has been diagnosed and corrected.

Microcomputer 122 has an 8-bit bi-directional port or data bus comprising pins DB0–DB7, an 8-bit quasi-bi-directional port comprising pins P10–P17, and a second 8-bit quasi-bi-directional port comprising pins P20–P27. Of these pins, I couple pins P12–P17, P24–P27, and DB0–DB7 to respective output lines 160*a*–160*t* controlling the various output devices of my bill and coin changer. (The letters "l" and "o" are not used here to avoid confusion with the similar-appearing numerals). As will appear below, lines 160*a*–160*t* are also given mnemonic designations, indicative of their functions, to facilitate understanding of the flowcharts shown in FIGS. 9*a* to 12.

Line 160*a* provides an input to a driver circuit 162, the internal configuration of which I show in FIG. 7. Referring now to FIG. 7, line 160*a* (LKT) is coupled to one end of a resistor 344, the other end of which leads to the base of the first of a pair of Darlington-coupled NPN transistors 348 and 350. A resistor 342 connects the 5 volt line 130 to the input end of resistor 344 to provide a bias potential to the transistors 348 and 350 while a second transistor 346 provides a path between the base of transistor 348 and ground. The collector and emitter of output transistor 350 constitute the outputs of driver 162 and will close an external circuit whenever a positive potential is applied to line 160*a*. Circuit 162 acts as a switch permitting current flow between the collector and emitter of transistor 350 whenever a high-level potential appears on line 160*a*. I connect the emitter and collector of transistor 350 respectively to ground and to a "coin lockout solenoid" line 164. Line 164 controls a solenoid (not shown) which is energized to allow coins to be deposited at certain points in the sequence of operation of the changer.

I couple line 160*b* (SHTDN) through an inverter 166 to another driver 168 identical to the driver 162. Driver 168 has its emitter output grounded while its collector output is applied to a "shutdown relay" line 170. Line 170 controls a relay in the power supply to be described which shuts off power when necessary to prevent damage to components or uncontrolled dispensing of change ("jackpotting").

Line 160*c* (LMP) is coupled to the input of a driver 172 also identical to the driver 162. Driver 172 has its emitter output grounded while the collector output feeds "out-of-service lamp" line 180 through a resistor 178. Line 180 controls a lamp (not shown) to indicate that the bill and coin changer is out of service. A light-emitting "fault" (LED) diode 174 coupled in series with a resistor 176 across resistor 178 provides an additional indication to the serviceman that the changer is out of service.

Lines 160*g*–160*j* (A-D) provide bit inputs to a hexadecimal decoder and driver circuit 182, the output of which drives a seven-segment digital display 184. Display 184 displays any one of 15 characters 1–9 or A–F (zero inputs being blanked) indicating either a particular fault in the bill and coin changer circuit or a particular condition prompting rejection of a dollar bill.

Line 160*k* (FWD) feeds a driver 186 similar to driver 162. I couple the collector and emitter of driver 186 respectively to the 5 volt supply line 130 through a resistor 188, and to the gate of a gate-controlled semiconductor switch or triac 190. Switch 190 is connected between ground and a "transport motor forward" line 192 which when energized drives transport motor 28 in a forward direction.

I couple line 160*m* (REV) to the input of a driver 194 similar to driver 162. A resistor 196 connects the collector of driver 194 to line 130. I connect the emitter of driver 194 to the gate of a triac 198. Switch 198 when energized couples ground to a "transport motor reverse" line 200 to drive transport motor 28 in a reverse direction. In a similar manner, line 160*n* (BPRSR) feeds the input of a driver 202, the emitter output of which is grounded and the collector output of which appears on a "bill pressure solenoid" line 204. Line 204 actuates solenoid 78 when energized.

Line 160*p* (STKR) drives a "bill stacker" line 208 through a resistor 206. Line 208 controls the mechanism (not shown) which stacks the bills from the bill acceptor 10 after they have cleared lever arm 112. One form of bill stacking mechanism which can be used is shown in U.S. Pat. No. 3,917,260, issued Nov. 4, 1975, to Okkonen and Herring. Line 160*q* (CRED) feeds a driver 210, the output of which drives an "external credit" line 218 through an inverter 216. External credit line 218 provides a signal to an optional external apparatus such as a vending machine indicating that sufficient credit has been established and that the machine may dispense the selected article. I connect a "credit" LED 212 and a resistor 214 in series between line 130 and the output of driver 210.

Referring now to FIG. 3, output lines 160*d*–160*f* (HOP1–HOP3) drive respective electronic relay circuits indicated generally by the reference numerals 220, 222 and 224. In response to positive or high signals on their input lines, relays 220–224 couple a "115 volt common" line 226 respectively to "5¢ hopper motor" line 228, "10¢ hopper motor" line 230 and "25¢ hopper motor" line 232. Lines 228–232 energize the motors (not shown) associated with the respective coin hoppers of the coin dispenser (not shown) in a manner to be further described. A three-input NOR gate 234 responsive to lines 160*d*–160*f* feeds a driver 236, the output of which is coupled through a resistor 240 to a "hopper" LED 238, one terminal of which is coupled to 5 volt line 130. "Hopper" LED 238 is lit in response to a high signal on any one of the output lines 160*d*–160*f* to indicate that a hopper motor is energized.

Output lines 228–232 are connected through respective resistors 242, 244 and 246 to one input of a photon-coupled isolator or optical coupler 248, the other input terminal of which leads to a "115 volt hot" line 250. A shunt diode 252 allows bi-directional current flow through resistors 242–246. I connect the collector of isolator 248 to line 130 through a resistor 254. The common emitter and base terminal of coupler 248 leads to the base of an NPN transistor 256. Transistor 256 has its emitter grounded and its collector coupled to line 130 through load resistor 258 and to a "hopper monitor" line (MON2) 374*b*. A capacitor 260 coupled between line 374*b* and ground filters out any undesirable transients. Hopper monitor line 374*b* provides a signal, to be used in a manner to be described, indicating that an AC voltage relative to line 250 actually appears on one of lines 228–232.

Output lines 160*r*–160*t* (BKT1–BKT3) feed the inputs of respective solenoid driver circuits indicated generally by the reference numerals 264, 266 and 268. In response to low output signals on lines 160*r*–160*t*, drivers 264–268 provide respective driving signals on $1 bucket solenoid" line 270, "50¢ bucket solenoid" line 272, and "25¢ bucket solenoid" line 274. Lines 270–274 energize solenoids (not shown) associated with the coin dispenser which operate in a manner to be described to dump or release the contents of respective change buckets (not shown) to the user. A NOR gate 276 responsive to the second output of each of solenoid drivers 264–268 feeds a driver 278. Driver 278 in turn is coupled through a resistor 280 to one terminal of a "vend" LED 282, the other terminal of which leads to line 130.

Each of electronic relays 220–224 and solenoid drivers 264–268 receives an inhibit input from a line 292 leading to the emitter of the output transistor 288 of a pair of NPN transistors 286 and 288 arranged in a Darlington configuration with line 130 providing a voltage source and with a resistor 290 between the output and the input line 284 leading to the reset input of microcomputer 122.

Line 284 normally carries a high potential which transistors 286 and 288 apply to line 292. When, however, line 284 drops to a low potential in response to a low supply voltage, transistors 286 and 288 cut off and the potential on line 292 drops to a relatively low value, inhibiting circuits 220–224 and 264–268. These circuits are disabled in response to a low supply voltage to prevent the erroneous dispensing of coins during abnormal operation of the bill and coin changer.

Referring now to FIG. 5, circuit 220, to which circuits 222 and 224 are identical, includes an NPN input transistor 300, having a grounded emitter and a base connected to line 160*d* through resistor 296. A resistor 294 between line 130 and input line 160*d* and another resistor 298 between the transistor base and ground complete the biasing circuit of transistor 300. The collector of transistor 300 leads to one input terminal of a photon-coupled isolator 302, the other input of which is provided by inhibit line 292 through resistor 304.

In isolator 302, a diode serves as the photon emitter while a silicon-controlled rectifier (SCR) serves as the photon receptor. Normally, in the absence of current flow through, and hence photon emission from, the diode, the SCR remains nonconductive, preventing current flow through the full-wave rectifier bridge comprising diodes 310, 312, 314 and 316. Under these conditions a triac 320 coupled between lines 226 and 228 is nonconductive. In response to current flow through the photon-emitting diode, the SCR becomes conductive, permitting current flow from line 228 through a resistor 318 and the rectifier bridge to the gate of triac 320, turning it on. Respective resistors 306 and 322 and shunt capacitors 308 and 324 prevent noise from falsely triggering the isolator SCR and triac 320, respectively. Circuit 220 thus provides AC coupling between line 226 and line 228 in response to a high-level signal on line 160*d* whenever line 292 carries a high (5 volt) potential.

Referring now to FIG. 6, in driver circuit 264, to which circuits 266 and 268 are identical, a line 160*r* feeds the input of a driver 326, the output of which is connected to the base of a PNP transistor 332 through a resistor 328. A resistor 330 couples the base to the emitter of transistor 332. Transistor 332 has its emitter coupled to inhibit line 292 and its collector coupled to an output line 334 used to drive NOR gate 276. The collector of transistor 332 also drives the base of an NPN transistor 340 through a voltage divider comprising resistors 336 and 338. I ground the emitter of transistor 340 and couple the collector to output line 270.

Circuit 264 operates as a directly coupled DC amplifier whenever a supply voltage is available on line 292, as is normally the case. In response to a low signal on line 160*r*, circuit 264 provides a high output on line 334 while transistor 340 provides a low-resistance path between line 270 and ground. If, however, line 292 should drop to a low potential, transistor 340 will remain cut off regardless of the level of the signal on line 160*r*, thus preventing the bucket solenoids from being erroneously actuated.

To couple the changemaker inputs to microcomputer 122, I respectively connect the T0 pin to the output of a first 1-of-16 data selector 352, such as a 74150, and pins P10 and P11 to the outputs of 1-of-16 data selectors 356 and 354. Circuits 352–356 each have 16 data inputs E0–E15 which may be selectively read by applying an appropriate four-bit binary signal 0000–1111 to address inputs A–D. I pass this four-bit address signal from output pins P20–P23 of microcomputer 122 to the address inputs A–D through respective drivers 358, 360, 362 and 364. Respective pull-up resistors 366, 368, 370 and 372 leading to line 130 normally hold the address inputs at a high logic level.

Referring particularly to FIGS. 2*a* and 2*b*, data selector 352 includes input pins E15–E6 and E4–E0 coupled to a plurality of input lines 374*a* to 374*q*, respectively, in turn connected to the various input devices of the bill and coin changer. Thus, line 374*a* (MON1) is coupled to the output of an inverter 376. A voltage divider made up of resistors 378 and 380 supplied with the output of a transistor 382 provides the input to inverter 376. A 40 v DC line 388 is the source of emitter voltage for transistor 382. Line 388 also provides the base bias through resistors 386 and 384. Line 390 provides the signal input to transistor 382. Whenever a bucket solenoid draws current in response to being energized through line 270, 272 or 274, the potential difference developed across resistor 386 renders transistor 382 conductive, creating a voltage drop across resistor 380. Inverter 376 provides a low-level signal on line 374*a* to indicate that one of the bucket solenoids is being energized.

As has been described above, line 374*b* (MON2) is coupled to the collector of transistor 256 to provide a low-level signal indicating that one of the hopper motors (not shown) is being energized. Line 374*c* (MON3), which is also coupled to 5 volt line 130 through resistor 392 and shunted by a capacitor 394, carries a low-level signal whenever the bill stacker motor (not shown) is energized. Likewise, line 374*d* (EXT), coupled to 5 volt line 130 through resistor 396 and to ground through capacitor 398, receives a low-level logic signal from an external apparatus such as a vending machine (not shown) to indicate that the apparatus has control and that the coin dispenser should not be actuated.

Input line 374*e* (DET1) provides a low-level signal from a suitable sensor (not shown) which detects the dispensing of a nickel from its hopper. Resistor 400 and capacitor 402 coupled between line 374*e* and ground provide suitable pulse shaping. Likewise, line 374*f* (DET2) provides a low-level signal from a sensor in response to the dispensing of a dime. Resistor 404 and capacitor 406 perform a shaping function similar to that of elements 400 and 402. Finally, line 374*g* (DET3) provides a low-level signal in response to the dispensing of a quarter. Resistor 408 and capacitor 410 perform the pulse-shaping function previously referred to.

LIne 374*h* (P4) is responsive to the output of an adjustable-gain amplifier 412, the input of which is derived from a line 414 coupled to photocell 96. Amplifier 412 also feeds a driver 416, the output of which feeds a "P4" LED 418 through a resistor 420. Similarly, line 374*i* (P6) is responsive to an inverter 422 which in turn is responsive to the output of an amplifier 424. Amplifier 424 has its input coupled to a line 426 connected to photocell 118.

Input line 374*j* (M) is responsive to the output of a combination adjustable-gain amplifier and clipper 428 which receives a 30 volt DC supply voltage from a line 429 and a signal input on a line 430 connected to the magnetic head 62. Since magnetic head 62 responds to changes in magnetic flux density, the signal produced on line 430 in response to the traversing by head 62 of the leading and trailing edges of the lines being scanned will comprise a series of alternating positive and negative pulses. The clipping point of amplifier-clipper 428 is set asymmetrically so that line 374*j* generates a logic level 1 output whenever line 430 is positive by more than a predetermined amount and generates a logic 0 output otherwise, as when line 430 is quiescent or negative. "Positive" and "negative", and "0" and "1", in this context, can of course be interchanged. Line 374*j* thus carries a train of pulses the corresponding edges of which are spaced in accordance with the spacing between the leading or trailing edges of the lines being scanned, depending on the polarity of the clipping point.

Amplifier 428 also feeds a driver 432, the output of which I couple to ground through a capacitor 434 and to the input of another driver 436. A resistor 440 applies the output of driver 436 to one terminal of a "magnetic head" LED 438, the other terminal of which is coupled to a 5 volt line 130.

Line 374*k* (P1) is responsive to the output of an adjustable-gain amplifier 442 receiving an input from a line 444 coupled to photocell 22. Amplifier 442 also feeds a driver 446 the output of which is coupled through a resistor 450 to one terminal of a "P1" LED 448, the other terminal of which I couple to line 130. Diodes 418, 438 and 448 permit ready monitoring by the serviceman of whether the gains of amplifiers 412, 428 and 442 are adjusted to proper levels.

In the coin changer with which my control circuit is used provision is made for alternately accepting either 50-cent pieces or dollar coins. A line 470 provides a low-level pulse in response to the deposit of either a 50-cent piece or a dollar coin, whichever coin the changer is designed to accept. A jumper cable 472 may be arranged to couple this line either to input line 374*m* (CS1) to indicate a deposit of a dollar coin or to line 374*n* (CS2) to indicate the deposit of a 50-cent piece. Line 374*p* (CS3) provides a low-level pulse in response to the deposit of a quarter. Respective pull-up resistors 452, 454 and 456, one terminal of each of which I couple to line 130, normally hold lines 374*m*–374*p* at a high logic level. Respective isolating diodes 458, 460 and 462 connect lines 374*m*–374*p* to respective "$1 test switch" line 464, "50-cent test switch" line 466 and "25-cent test switch" line 468, which receive low-level pulses whenever the serviceman wishes to simulate the deposit of a particular coin. Respective diodes 474, 476 and 478 couple lines 464–468 to input line 374*q* (TST) to provide a signal on that line indicating that one of the test switches has been actuated. Pull-up resistor 480, one terminal of which leads to line 130, normally holds line 374*q* at a high logic level.

Referring now to FIG. 4, respective banks of program switches 482, 484 and 486 are used to set the desired change combination for a given bill or coin deposit. More particularly, in a dollar switch bank 482, output lines $1N, $2N, $4N and $8N together provide a four-bit signal indicating the number of nickels to be dispensed in response to the deposit of a dollar bill or coin. Similarly, output lines $1D, $2D, $4D and $8D together provide a four-bit signal indicating the number of dimes to be dispensed in response to the deposit of a dollar bill or coin. Finally, outputs $1Q, $2Q, $4Q and $8Q together provide a four-bit signal indicating the number of quarters to be dispensed in response to the deposit of a dollar bill or coin.

In a similar manner, outputs H1N–H8Q of half-dollar switch bank 484 provide three four-bit signals indicating respectively the number of nickels, the number of dimes and the number of quarters to be dispensed in response to the deposit of a half-dollar. Likewise, outputs Q1N–Q8D of a quarter switch bank 486 provide two four-bit signals indicating respectively the number of nickels and the number of dimes to be dispensed in response to the deposit of a quarter. All of these output lines are normally held at a high logic level by pull-up resistors similar to resistors 488, 490 and 492 but are grounded in response to actuation of a particular switch. As an illustration of the manner in which these output lines encode the desired change combination, grounding output line $4Q while leaving the remaining lines of dollar switch bank 482 at a high potential will signal that four (0100 in binary) quarters are to be dispensed in response to the deposit of a dollar bill or coin. I couple the 32 output lines to switch banks 482–486 to the input pins of data selectors 354 and 356 to permit the change combination settings to be read by suitably actuating output pins P20-P23 of microcomputer 122.

Referring now to FIG. 8, in the power supply circuit for the control circuits shown in FIGS. 2 through 7, respective input lines 226, the "115 volt common" line, and 494, carrying a line voltage of 115 volts AC, feed the primary winding of a power transformer 496 having a 30 volt secondary winding and a 11.5 volt secondary winding. A normally open switch 497 controlled by a relay coil 538 couples line 494 to "115 volt hot" line 250. The 30 volt winding of transformer 496, one end of which is grounded, provides the input to a +30 volt regulated DC output to line 429 through a normally open switch 504 controlled by relay coil 538. A "30 volt" LED 500 coupled between the 30 volt output of power supply 498 and ground through a resistor 502 indicates the presence of an output on the power supply line feeding line 429.

The ungrounded terminal of the 30 volt winding of transformer 496 drives a "30 volt AC" line used to energize bill transport motor 28 through a normally open switch 506 also controlled by relay coil 538. A rectifier diode 508 coupled to the 30 volt AC line provides a DC output filtered by capacitor 510. I connect this output to the 40 volt DC line 388 through a normally open switch 516 also controlled by relay coil 538. A "40 volt" LED 512 coupled between the ungrounded terminal of capacitor 510 and ground through a resistor 514 indicates the presence of a voltage on the line feeding line 388.

I couple the 11.5 volt winding of transformer 496 to a low-voltage power supply 518 which provides a 14 volt DC output to line 148. A "14 volt" LED 520 coupled between line 148 and ground through a resistor 522 indicates the presence of a signal on line 148. I also couple line 148 to the input of a voltage regulator 526, the output of which provides the 5 volt DC potential on line 130. Respective filter capacitors 524 and 528 provide AC paths between lines 148 and 130 and ground. Power supply 518 also directly supplies a 5 volt potential to a line 534. A "5 volt" LED 530 coupled between line 534 and ground through a resistor 532 indicates the presence of a potential on line 534.

High-current power supply 498 has an unregulated DC output which I couple to one terminal of relay coil 538 through a resistor 536. I couple the other terminal of relay coil 538 to "shut-down relay" line 170 so that coil 538 is energized, closing switches 497, 504, 506 and 516, whenever line 170 is at ground potential, as it is in normal operation of the changer. A shunt diode 540 coupled across relay coil 538 provides a current path when relay coil 538 is de-energized.

The coin dispenser with which my control circuit is used includes a plurality of escrow buckets (not shown), each of which carries a certain amount of change in the ready state of the dispenser. For example, three buckets may be provided which, respectively, hold change of one dollar, one half dollar and one quarter dollar. In response to deposit of a genuine bill or coin to be changed, a solenoid is energized to actuate one of the buckets to deliver the change contained therein. Following actuation of a bucket its supply of change is replenished from coin hoppers (not shown) which may be of the type disclosed in U.S. Pat. No. 3,910,295. As is shown in that patent, each hopper has an individual drive motor as well as a photodetector for sensing the dispensing of individual coins from the hopper. Since the dispenser with which my control circuit is used does not per se form part of my invention it will not be described in detail.

Associated with each of the input currency denominations and stored in a portion of the data memory (not separately shown) of microcomputer 122 is respective 28-bit coin code 550, 552 or 554. As shown in FIG. 9, each coin code comprises a 4-bit bucket code, used to control the operation of the bucket solenoids, followed by six 4-bit strobe codes A to F, used to address the data inputs of data selectors 354 and 356. Each 4-bit bucket code in turn comprises an initial "25¢ flag" bit, which is set at 1 in the 25¢ coin code 550 to indicate that the input currency is a quarter, as well as three bucket bits "BKT1" ($1), "BKT2" (50¢) and "BKT3" (25¢), one of which is set at 1 to indicate the bucket solenoid to be actuated.

Strobe codes A to D of 25¢ coin code 550 and strobe codes A to F of 50¢ coin code 552 and $1 coin code 554 together constitute sixteen 4-bit address signals applied to pins A to D of data selectors 356 and 354 to strobe respective pairs of inputs, having pin numbers indicated in parentheses in FIG. 9, onto output lines coupled to input pins P10 and P11 of microcomputer 122.

Referring now to FIG. 10, associated with the dispensed coin denominations are respective "nickel data" register 556, "dime data" register 558, and "quarter data" register 560. Registers 556, 558, 560, internal to microcomputer 122, are used to control the dispensing of coins from individual hoppers in a manner to be described. In the nickel data register 556, a 4-bit "N count" register portion 562 keeps track of the number of nickels to be dispensed; an "N cover time" register portion 564, in turn comprising "maximum" and "minimum" cover time register subportions, keeps track of the time during which the 5¢ coin detector line **374*e* is actuated; and an "N space time" register portion 566 keeps track of the time between successive actuations of line 374*e*. Similarly, in the dime data register 558, a 4-bit "D count" register portion 568 keeps track of the number of dimes to be dispensed; a "D cover time" register portion 570 comprising "maximum" and "minimum" cover time subportions keeps track of the time during which the 10¢ coin detector line 374*f* is actuated; and a "D space time" register portion 572 keeps track of the time between successive actuations of line 374*f*. Finally, in the quarter register 560, a 4-bit "Q count" register portion 574 keeps track of the number of quarters to be dispensed; a "Q cover time" register portion 576 comprising "maximum" and "minimum" cover time subportions keeps track of the time during which the 25¢ coin detector line 374*g* is actuated; and a "Q space time" register portion 578 keeps track of the time between successive actuations of line 374*g***.

Referring now to FIGS. **11*a* to 11*c*, the main program of the bill and coin changer including my control circuit starts at block 600 with the external interrupt pin INT enabled. Initially (block 602) the coin lockout line LKT is energized to permit the deposit of coins, while all other outputs remain unenergized. A separate entry point 604 is provided after block 602 to permit entry into the main program without energizing the coin lockout solenoid. After the initialization step, the inputs 374*a*–374*i* are sequentially scanned to see whether any of them are active (blocks 606 and 608). If any of these inputs are active, the program jumps (block 610**) to a "fault detect" routine to be described, as none of the inputs should be active at this time.

Next, the P1 photocell input is interrogated to see whether it is active (block 612). If P1 is active, the coin lockout line LKT is de-energized (block 614) to prevent coins from being deposited and a timer (not shown) internal to microcomputer 122 is initialized to 20 milliseconds (block 616). If input P1 changes to an inactive state at any time during this 20 ms period (block 618), the program returns to start (block 620) on the assumption that the input P1 was spuriously actuated. If, on the other hand, input P1 remains actuated at the end of a 20 ms period (block 622), the program jumps to the "$ validate" routine shown in FIGS. 13*a*–13*k* (block 624).

If at block 612 input P1 is inactive, the microcomputer then examines the coin switch inputs CS1–CS3 (block 626) to see whether any of them are active. If none of the coin switch inputs are active, the program returns (block 628) to the starting block 600. If, on the other hand, such an input does appear, the program de-energizes the coin lockout line LKT (block 632) to prevent further coins from being deposited and initializes the timer to 15 ms (block 634). If the input that was formerly active becomes inactive before the end of this 15 ms period, the program again returns to the starting block 600 (blocks 636 and 638).

If the timer reaches zero with a coin switch input still active (block 640), the TST input is tested (block 644) to see whether the CS input is due to the actual deposit of a coin or merely to the simulation of such a deposit by the serviceman. If the deposit is only a simulated deposit, the program initializes the timer to 2 seconds (block 645), stores a fault code of 9 (block 646), and jumps to block 650. If the test input is inactive, the microcomputer initializes the timer to 130 ms (block 647) and stores a fault code of 8 (block 648) before also jumping to block 650.

At this point the program traces a loop comprising blocks 650 to 658 while the timer times out. If, before the timer reaches zero, the coin inputs become inactive and remain so after a 5 ms delay (blocks 650, 654 and 656), the program exits from the loop and resumes along its normal path. If, on the other hand, one or more coin inputs are still active when the timer reaches zero (blocks 650 and 658), the program energizes the out-of-service lamp line LMP and outputs the previously stored fault code on lines A–D to indicate that a particular coin switch or test switch was actuated too long (block 660). Thereafter the program returns to block 604 (block 662).

If the coin switch input was actuated for the proper length of time, the program next asks whether the input CS3 was the active input (block 668), and, if so, stores the 25-cent coin code 550 (FIG. 9) in a "coin code" register (not shown) of microcomputer 122 (block 670) and jumps (block 672) to the "dispense" routine (FIGS. 17*a*–17*e*) to be described. If the actuated input was the 50-cent input (block 674), the program stores the 50-cent coin code 552 in the coin code register (block 680) and jumps to the routine "dispense" (block 682). Otherwise, the program stores the one-dollar coin code 554 in the coin code register (block 676), as this is the only remaining possibility, and jumps to the routine "dispense" (block 678).

In FIG. 12, I show the "fault detect" routine for continuously monitoring the inputs 374*a*–374*i* for signs of abnormal operation. The "fault detect" routine starts at block 684. After a 5 ms delay to check for noise (block 686), each of the inputs 374*a* to 374*i* is scanned to see whether it is active (block 688). If no input is still active, the routine returns to the start of the main program at block 600 (block 690).

If one of the inputs 374*a* to 374*i* is still active, the routine then disables thhe coin lockout line LKT to prevent further depositing of coins, energizes the LMP line to illuminate the out-of-service lamp, energizes the SHTDN line to turn off the high-current power supply portion, and provides the appropriate fault code on lines A–D (block 692).

In the apparatus shown and described, the fault codes are assigned to erroneously active inputs as follows:

| Input | Fault Code |
|---|---|
| 374a (MON1) | 15 (F) |
| 374b (MON2) | 14 (E) |
| 374c (MON3) | 13 (d) |
| 374d (EXT) | 10 (A) |
| 374e (DET1) | 12 (C) |
| 374f (DET2) | 12 (C) |
| 374g (DET3) | 12 (C) |
| 374h (P4) | 11 (b) |
| 374i (P6) | 11 (b) |

The routine then tests if the active input is one of the lines MON1, MON2 or MON3 (block 694). If this is the case, the subroutine halts (block 696) to wait for an external reset. Otherwise, the routine returns to block 688 to continue to look for active inputs among the inputs 374*a* to 374*i*, returning to the main program if the spuriously active input subsequently returns to a quiescent state (blocks 688, 690).

As previously mentioned, the "$ validate" program beginning at block 716 of FIG. 13*a* is entered whenever the input P1 remains active for more than 20 milliseconds (blocks 616–624). Initially, the FWD output is energized to drive the inserted bill in a forward direction, while the BPRSR output is energized to move the pressure roller 64 away from the magnetic head 62 during the initial part of the routine (block 718). Next, a timer is initialized to define a 700 ms interval (block 720). If, within this interval, input P1 becomes inactive and remains inactive after a 5 ms delay (blocks 722, 724 and 726), a reject code of 1 is stored (block 728) and the routine "$ validate" jumps to the routine "reject" shown in FIG. 15 (block 730). Further, if within this test interval either of the inputs P4 or P6 becomes active and remains active after a 5 ms delay (blocks 732, 734 and 736), a reject code of 2 is stored (block 738) and the routine "$ validate" again jumps to the routine "reject" (block 740). This first test interval thus rejects bills which are too short (i.e., less than about 5 inches) or where the cells P4 or P6 are actuated before they should be. The 5 ms delays (blocks 724 and 734) incorporated in this and subsequent tests in the "$ validate" routine are intended to ensure against an erroneous result as a result of noise.

After the first length test, I subject the inserted bill to an additional test to determine whether it is too long. I first initialize a timer to 4.3 seconds (block 744) to define a test interval which is terminated either at the end of the 4.3 second period or when input P1 again becomes inactive (block 746) signifying the passage thereby of the trailing edge of the bill. If, within this interval, either of the inputs P4 or P6 becomes active and remains so after a 5 ms delay (blocks 748, 750 and 752), the routine stores a reject code of 2 (block 754) and jumps to the "reject" routine (block 756). Entry into this part of the program indicates an erroneous sequence of inputs, since the cell P1 is spaced farther apart from cells P4 and P6 than the length of a one-dollar bill. Also, if at the end of the 4.3 second period, the P1 input is still active (block 758), the program stores a reject code of 3 (block 760) and jumps to the "reject" routine (block 762).

If the program successfully exits (block 746) from this portion of the test, the inserted bill is in a proper position for the first line check to determine the spacing between the vertical lines in the background portion of one side of the portrait. Initially, (block 784) the output BPRSR is de-energized to allow roller 64 to urge the bill against the magnetic head 62. After a 40 ms delay (block 785), the program stores (block 786) a reject code of 4, initializes (block 788) a "good count" register, internal to microcomputer 122, to 38, and initializes (block 790) a timer to 75 ms before transferring (block 792) to the subroutine "line check" (FIG. 14) to be described.

After exiting from this subroutine, the program initializes a timer to 65 ms (block 794) and enters a loop (blocks 806–826) during which the inputs P1 and P6 are checked while waiting for the second magnetic test. At this point in the program, the leading edge of a normal bill should be about ⅓ of an inch beyond the cell P4. If input P6 is active and remains so after a 5 ms delay (blocks 806, 808 and 810), the program stores a reject code of 5 (block 812) and transfers (block 814) to the routine "reject", as cell P6 should not be active at this time. If cell P1 is active and remains so after a 5 ms delay (blocks 816, 818 and 820), the program stores a reject code of 11 (block 822) and transfers to the "reject" routine (block 824). After exiting from this wating loop (block 826), the program examines the input P4. If input P4 becomes inactive and remains so after a 5 ms delay (blocks 796, 798 and 800), the program stores (block 802) a reject code of 6 and transfers (block 804) to the routine "reject". If input P4 is active, the program stores (block 828) a reject code of 7, initializes the "good count" register (block 830) to 18, and initializes (block 832) a timer to 80 ms before transferring again to the subroutine "line check" (block 834).

The "line check" subroutine, which is also described in the copending application of Larry F. Lee, Ser. No. 48,044, filed June 13, 1979, is shown in FIG. 14. After entering the subroutine (block 836), the program clears an internal "line count" register (block 838) and "pulse width count" register (840) in preparation for counting vertical lines. The program then enters a first loop (blocks 842, 844 and 846) in which the pulse width count register is incremented (block 844) periodically until the program exits from the loop in response to a low input on the M line (block 846). The program then enters a second loop (blocks 848, 850 and 852) in which the pulse width count register is further incremented periodically until the program exits from that loop in response to a high input on the M line (block 852).

At this point, the content of the pulse width count register, which is proportional to the spacing between the two last leading edges of the M input, is compared (blocks 854 and 858) both with a predetermined minimum pulse width and a predetermined maximum pulse width before returning to block 840 to measure a second pulse. If the pulse width count is both greater than the predetermined minimum (block 856) and less than the predetermined maximum (block 860), the line count register is incremented (block 862) and the program returns to block 840 to measure the spacing of the next leading pulse edge. If the pulse width count does not fall within this range, the program simply returns to block 840 without incrementing the line count register.

The background portion of the portrait area of a genuine U.S. one-dollar bill contains about 110 vertical lines per inch. These vertical lines are spaced from each other by about 9.0 mils. Since higher-denomination U.S. bills have less closely spaced vertical lines, and since it is desirable to be able to reject these bills as well as counterfeit bills, the range of acceptable pulse spacings is preferably asymmetrically placed about the average so that line spacings between about 6.3 mils, or 30% below average, and 9.9 mils, or about 10% above average, are accepted.

When the timer reaches zero (blocks 842 and 848), the program stops measuring pulses and compares (block 864) the content of the line count register with that of the "good count" register, which is preset at a count equal to about 80% of the lines scanned on a particular pass through the "line check" subroutine. To allow for variations in alignment of the printed matter on the front of the bill relative to the leading edge of the bill, each pass through the "line check" routine is so timed as to scan a zone along the strip traversed by head 62 that is somewhat longer at each end than the strip portion normally containing the vertical lines. If the line count is less than the predetermined "good count", the subroutine jumps (blocks 866 and 868) to the "reject subroutine. Otherwise the program returns (block 870) to the next point in the "$ validate" program.

After the program leaves the "line check" subroutine the second time, the timer is initialized (block 872) to 150 ms to define a period in which a further magnetic test is conducted. At this point the magnetic head 62 is beginning to traverse the serial number and Federal Reserve seal region of the bill, which on a genuine bill are printed with nonmagnetic ink. A "pulse count" register is also initialized (block 874) to a count of 3. The program then enters a loop (blocks 876–920) from which it exits (block 906) when the timer reaches zero. If, on any pass of this loop, the P6 input becomes inactive and remains so after a 5 ms delay (blocks 876, 878 and 880), the program stores a reject code of 9 (block 882) and transfers (block 884) to the "reject" routine. Similarly, if on any pass through the loop, the input P4 is inactive and remains so after a 5 ms delay (blocks 886, 888 and 890), the program stores a reject code of 10 (block 892) and jumps (block 894) to the "reject" routine. Likewise, if on any pass through the loop, input P1 becomes active and remains active after a 5 ms delay (blocks 896, 898 and 900), the program stores a reject code of 11 (block 902) and jumps (block 904) to the "reject" routine.

If, on a given pass after the above tests are performed, the magnetic input M is found to be active (block 908), the program enters a waiting loop (blocks 910 and 912) which it exits when either the magnetic input M becomes inactive (block 910) or the timer reaches zero (block 912). If the latter event occurs, the program stores a reject code of 15 (block 914) and jumps (block 916) to the "reject" routine. If on the other hand, the magnetic input M again becomes inactive in this loop, the pulse count register is decremented (block 918) and examined (block 920) to determine whether its content is now zero. If the updated pulse count register content is zero, indicating that three magnetic pulses have been detected within the test interval, the program jumps to blocks 914 and 916, described above. Otherwise the program simply returns to block 876 to complete another pass of the loop.

After the program exits the loop from block 906, the timer is re-initialized to 340 ms (block 921) to define a time interval during which the program traverses a further loop comprising blocks 922–952. During this portion of the passage of the inserted bill, inputs P4 and P6 should be active while input P1 should be inactive. Any sensed deviation from this normal state will cause the bill to be rejected. If, on any pass of this loop, input P4 is inactive and remains so after a 5 ms delay (blocks 922, 924 and 926), the program stores a reject code of 10 (block 928) and jumps (block 930) to the "reject" routine. Similarly, if on any pass of this loop, input P6 is found to be inactive and remains so after a 5 ms delay (blocks 932, 934 and 936), the program stores a reject code of 12 (block 938) and again jumps to the "reject" routine (block 940). Finally, if input P1 is found to be active and remains so after a 5 ms delay (blocks 942, 944 and 946), the program stores a reject code of 11 (block 928) and also jumps to the "reject" routine (block 950).

If a genuine bill has been inserted, input P4 should change to an inactive state approximately 30 ms after the program exits from the above-described loop at block 952. To sense whether this in fact occurs, the program first initializes (block 954) the timer to 160 ms. The program then enters a loop comprising blocks 956–1000 from which it exits when the input P4 becomes inactive. If, on any pass through this loop, input P6 is found to be inactive and remains so after a 5 ms delay (blocks 964, 966 and 968), the program stores a reject code of 12 (block 970) and jumps to the "reject" routine (block 972). If, during any pass input P1 is found to be active and remains so after a 5 ms delay (blocks 1000, 1002 and 1004), the program stores a reject code of 11 (block 1006) and jumps (block 1008) to the "reject" routine. If, at the end of the 160 ms period, input P4 is still active (blocks 956 and 958), the program stores a reject code of 13 (block 960) and jumps to the "reject" routine (block 962).

After input P4 becomes inactive, causing the program to exit from the above-described loop (block 956), the program disables (block 974) the external interrupt line 150 to prevent induced bill rejection after this point, and waits (block 975) for the timer to reach zero. Next, the program initializes (block 976) the timer to 35 ms to define a time period during which input P6 should remain in an active state. During this portion of the program, the P4 photocell should not be covered. If, during any pass of the loop comprising blocks 978–1010, input P4 should be found to be active and remains so after a 5 ms delay (blocks 990, 992 and 994), the program stores a reject code 13 (block 996) and jumps (block 998) to the "reject" routine. If, on any pass through the loop, input P6 is found to be inactive and remains so after a 5 ms delay (blocks 978, 980 and 982), the program stores a reject code of 12 (block 986) and jumps to the "reject" routine (block 988).

After exiting this loop comprising blocks 978–1010 (block 1010), the program re-initializes the timer to 135 ms (block 1012) to define a 135 ms period within which the cell P6 should uncover. During this time interval, the program traverses a loop comprising blocks 1014–1030. If a normal bill has been inserted, the program exits from this loop before the timer counts to zero when the P6 input becomes inactive and remains so after a 5 ms delay (blocks 1014, 1042 and 1044). If the timer reaches zero before input P6 returns to an inactive state (block 1016), the program stores a reject code of 14 (block 1018) and jumps (block 1020) to the "reject" routine. If, on any pass of the loop, input P4 should be found to be active and remains so after a 5 ms delay (blocks 1022–1026), the program, stores a reject code of 13 (block 1028) and jumps to the "reject" routine (block 1030).

Upon exiting from the above loop, the program has completed its sequence of tests on the inserted dollar bill and is now ready to begin the acceptance procedure. To this end, the program again initializes the timer (block 1046) to 75 ms to define a time interval during which outputs are provided on the CRED line (block 1048) to generate a credit signal on line 218 to be used by optional external apparatus. At the end of this period (block 1050), the timer is initialized to 200 ms (block 1052) to define a period during which the CRED and FWD lines are de-energized and the STKR line energized, to actuate the stacker motor (not shown), while all other outputs remain unchanged (block 1054). At the end of this time interval (block 1056) all of the outputs are de-energized (block 1058) and the program examines (block 1060) the external lockout input ENT to determine whether the external apparatus is assuming control of the procedure. If a signal appears on the EXT line and remains after a delay of 5 ms (blocks 1060, 1062 and 1064), the program simply returns (block 1065) to the starting point 600 of the main program. If no such signal is detected, the program stores (block 1066) the one-dollar coin code in the coin code register and jumps (block 1068) to the "dispense" routine.

Referring now to FIG. 15, the "reject" routine for returning abnormal dollar bills to customers and for displaying the appropriate reject code begins at block 1070. Initially, outputs REV and BPRSR are energized to drive the dollar bill in a reverse direction toward the customer and to move the roller 64 out of the bill transport path (block 1072). Thereafter the program initializes the timer to 3 seconds (block 1074). If either of inputs P4 or P6 is active at the beginning of this period and remains active until the end of the period (blocks 1076 and 1078), the program jumps (block 1080) to a "self clear" routine (FIG. 16) on the assumption that an object has become jammed in the bill transport.

The program then examines (block 1084) the stored reject code. If the reject code is any number other than 1, the program delays 725 ms (block 1086). If, on the other hand, the reject code is 1, indicating that the condition occasioning rejection of the bill was that it was too short, the program delays for a shorter period (block 1088), as it is not necessary in this case to run the transport motor in reverse for a full 725 ms. After the delay, the program disables the REV and BPRSR lines and provides the appropriate reject code on output lines A–D to display a coded character indicating the nature of the condition occasioning rejection. Finally, the routine returns to block 604 of the main program (block 1092).

In FIG. 16, I show the "self clear" routine to which the program transfers when an object has become jammed in the bill transport. After initializing an outer loop count at zero (block 1112), the program makes two passes (block 1118) through an inner loop (blocks 1114 to 1118) in which the output REV is first energized for 500 ms to run the bill transport in reverse and then output FWD is energized for 250 ms to run the bill transport in a forward direction. After this initial rocking procedure, the program energizes the REV output for another 2 seconds (block 1220) to run the bill transport again in a reverse direction, and then examines the inputs P1, P4 and P6 to determine whether any of them are still active (block 1122). If none of these inputs is active, indicating that the object has been cleared from the transport, the program returns (block 1124) to the starting point 600 of the main program.

If, on the other hand, any of these inputs is still active, the program increments (block 1126) the outer loop count register and returns to the inner loop formed by blocks 1114–1118 to initiate another rocking sequence. If the rocking sequence is attempted three times unsuccessfully, the program leaves the outer loop (block 1128) and sets the fault code to 6 or 11 (displayed as "b") depending on whether P1 is active or inactive (blocks 1129, 1130 and 1130*a*). The program then energizes output LMP to energize the out-of-service lamp, de-energizes the other outputs including BPRSR and LKT to allow roller 64 to move back into the bill transport path and to prevent the further deposit of coins, and outputs the previously stored fault code on lines A–D (block 1131). At this point, the program returns to the starting point 600 whenever all of the inputs P1, P4 and P6 become inactive (block 1132), but otherwise continues indefinitely along a loop comprising blocks 1129 to 1132.

Referring now to FIGS. 17*a*–17*e*, the "dispense" routine for dispensing change in response to the deposit of a bill or coin begins at block 1134. Initially, (block 1136) the program initializes a timer to 300 ms to define an interval within which one bucket solenoid line, BKT1, BKT2 or BKT3 as determined by the bucket portion of the stored coin code, is actuated to release the change combination previously loaded into the particular bucket to the user (block 1138).

During this time interval, after the proper bucket solenoid has been actuated, program switch banks 482, 484 and 486 are interrogated to determine the proper change combination with which to replenish that bucket. More particularly, the program first outputs the strobe code A (block 1140) from pins P20 to P23 of the microcomputer 122 so that switch code A, or the 8's and 4's places of the binary coded decimal signal representing the number of nickels to be replenished, may be read through pins P10 and P11 respectively (block 1142). These two bits are then stored in the upper two places of the N (nickel) count register portion 562 (block 1144). In a similar manner (blocks 1146, 1148 and 1150), the program then outputs strobe code B on pins P20–P23 to load the 2's and 1's place bits, or switch code B, into the N count register portion 562. After the N count register has been fully loaded in this manner, the program outputs strobe codes C and D to obtain the two most significant bits (switch code C) and then the two least significant bits (switch code D) to be stored in the D (dime) count register portion 568 (blocks 1152–1162).

If the most significant bit of the bucket code is zero (block 1164), indicating that the change combination to be replenished is other than change for a quarter, the program then successively outputs strobe codes E and F to obtain the two most significant bits (switch code E) and then the two least significant bits (switch code F) to be loaded into the Q (quarter) count register portion 574 through pins P10 and P11 (blocks 1168–1178). If, on the other hand, the most significant bit of the bucket code is 1 (block 1164), indicating that the change being replenished is for a quarter, blocks 1168–1178 are bypassed and instead a zero is loaded into the Q count register portion 574 (block 1166), as the change combination for a quarter will always comprise only nickels and dimes.

Thereafter, the program computes the monetary value of the selected change combination (blocks 1180–1186) and compares this value with the value of the bill or coin inserted (block 1188). If the values match (block 1190), the program waits until the timer has reached zero (block 1196). If the two values do not match, the program retraces the loop comprising blocks 1138–1190 (block 1192) and, if the values remain unequal at the end of the 300 ms period, outputs a fault code 1 on output lines A–D (block 1194). Since, however, a change combination of a lesser monetary value than that of the bill or coin inserted may have been deliberately set, the program simply continues after providing this indication.

After shutting off (block 1198) the bucket solenoid that was initially actuated, the program interrogates the solenoid monitor line MON1 to ensure that the solenoid is actually turned off. If the MON1 line is active at this point and remains active after a delay of 5 ms (blocks 1200, 1202 and 1204), the program generates outputs on the SHTDN and LMP lines to shut down the solenoid power supply circuit and to energize the out-of-service lamp (block 1206). The program also generates a fault code of 15 (displayed as "F") on lines A–D. Thereafter, the program halts and waits for an external reset (block 1208), as the fault is not of a self-correcting kind.

After these initial checks, the hopper motor lines HOP1, HOP2 and HOP3 are actuated for each of the coin denominations for which one or more coins are to be dispensed (blocks 1218–1228). After the hopper motors have been energized, the program initializes the timer to 45 seconds (block 1230) to define a maximum time period within which the bucket previously emptied must be replenished with the proper change combination. Thereafter, the program initalizes the minimum and maximum cover time register subportions of the nickel, dime and quarter data registers 556, 558 and 560 to 4.5 ms and 300 ms, respectively, to define minimum and maximum time periods during which a coin pulse must last to decrement the corresponding coin count (block 1232). The program also initializes respective space time register portions 566, 572 and 578, which are used to measure the duration of the quiescent periods between successive coin pulses (block 1234).

Thereafter, the program enters into a loop (blocks 1236–1246) for the duration of the 45-second replenishing period. During each pass of this loop, the program calls a "count" subroutine (FIGS. 18*a* and 18*b*) three times, once for each of the nickel, dime and quarter coin combinations being dispensed. In this manner, the microcomputer 122 is able to keep track simultaneously of the dispensing of the three coin denominations by attending to the individual coin denominations in a time-sharing fashion.

The "count" subroutine, to be described, decrements the nickel, dime and quarter registers each time a coin of the particular denomination is dispensed. If, before the end of the 45-second period, all of the count register portions 562, 568 and 574 have been decremented to zero, indicating that the correct number of coins of each denomination have been dispensed, the dispense subroutine exits (block 1246) from the loop comprising blocks 1236–1246. The program then initializes the timer to 1 second (block 1246*a*) to define a time period during which the "count" subroutine is repeatedly entered (blocks 1247 and 1247*a*) to determine whether any extra coins have been dispensed after the count has been satisfied. This may occur, for example, if the hopper motor brakes have become faulty. Upon exiting from this latter loop at the end of the 1-second time interval, the routine returns (block 1248) to the start of the main program at block 600.

If, on the other hand, the 45-second timer reaches zero before the program exits the loop in the manner described above, the program stores a fault code of 2, 3 or 4, according to whether the N count register portion 562, the D count register portion 568, or the Q count register portion 574 has a nonzero content (blocks 1250–1258). After that, the SHTDN and LMP lines are energized to disable the electromechanical components and energize the out-of-service lamp, while all other outputs are held low (block 1260). The program also outputs on lines A–D the fault code previously stored to display the fault code character. Thereafter, the program halts (block 1262) to wait for an external reset, as this particular fault is not self-correcting. It will be appreciated that while a replenishing period of 45 seconds is used in the embodiment shown, the exact period to be used depends on the particular choice of coin hoppers and other apparatus and may be either greater or less than the 45-second period described.

Referring now to FIGS. 18*a* and 18*b*, the "count" subroutine, which is repeatedly entered from the "dispense" routine during the 45-second replenishing interval, starts at block 1264. The subroutine first (blocks 1266–1274) checks the content of the denomination register, initially set at 1 at the beginning of the replenishing loop in the "dispense" routine (block 1236), and retrieves the current contents of the appropriate coin data register 556, 558 or 560, as indicated by the value of DENOM. After passing through a multipath subroutine portion to be further described, the "count" subroutine stores (block 1284) the updated contents of the coin data register, increments the denomination register (block 1286) and returns (block 1288) to the "dispense" routine.

Although the multipath portion comprising blocks 1276–1282 and 1290–1322 is entered in an interleaving fashion for each of the three coin denominations, its operation is best understood by considering only one particular coin denomination, for example, a nickel. Prior to the actuation of the coin detector input DET1, the "count" subroutine proceeds along the path comprising blocks 1276, 1278 and 1282, since the N space time register portion 566 has been initialized at zero. When, however, the detector input DET1 first becomes active (block 1276), the subroutine then proceeds along the path comprising blocks 1276 and 1290–1298. On each pass along this path, the subroutine decrements both the maximum (block 1290) and minimum (block 1296) cover time subportions of nickel data register 562.

After a period of 4.5 ms has elapsed following the initial actuation of the DET1 line, the subroutine proceeds one time, after block 1298, along the path portion comprising blocks 1300–1306, as the minimum cover time subportion of register 562 has now reached zero (block 1298). On this one pass, the subroutine decrements the N count register portion 562 (block 1300) and initializes the N space time register portion 566 to 100 ms (block 1306).

Thereafter, while the DET1 line remains active, the subroutine proceeds along the path comprising blocks 1276, 1290–94 and 1306.

If the detector line DET1 returns to an inactive state within 300 ms after becoming active, the subroutine then proceeds along the path comprising blocks 1276, 1278, 1280 and 1282. During each pass of this path, the subroutine decrements the N space time register portion 566 (block 1280) and resets the minimum and maximum cover time register subportions to 4.5 ms and 300 ms, respectively. When, after 100 ms has elapsed following the deactuation of the DET1 line, the space time register reaches zero, the subroutine then proceeds along the original path comprising blocks 1276, 1278 and 1282 and, if the original coin count was 2 or more, the operation proceeds for one or more cycles in the manner previously described.

When, finally, on the single pass through block 1302, the coin count is sensed to have been decremented to zero, indicating that the bucket has been replenished with the proper number of nickels, the subroutine bypasses block 1304 and proceeds instead through block 1308 to disable the nickel hopper motor.

If the detector output remains continuously active for 300 ms or more (block 1294), indicating a fault, the maximum cover time register subportion will be sensed to have reached zero (block 1292). The subroutine thereafter proceeds along a path in which it enables lines SHTDN and LMP to shut down the hopper motor power supply circuit and energize the out-of-service lamp, and provides a fault code of 7 on lines A–D (block 1310). The subroutine then halts (block 1312) to wait for an external reset.

As mentioned above, the "dispense" routine continues to enter the "count" subroutine after the last of the three hopper motors is turned off to determine whether extra coins have been erroneously dispensed. If one of the coin inputs DET1–DET3 is actuated after the corresponding coin count has been decremented to zero, the coin count will be sensed to have gone negative (block 1304). The subroutine then proceeds along a path portion in which the coin count is reset to zero (block 1314) and an "extra coin count" register, not separately shown and initially at zero, incremented (block 1316). If there is a second such occurrence, the "extra coin count" register will be sensed to have reached a count of 2 (block 1318). The subroutine then actuates the SHTDN and LMP lines to disable the electromechanical power supply and energize the out-of-service lamp, and provides a fault code of 5 on lines A–D (1320). Thereafter the subroutine halts and waits for an external reset (block 1322). The operation of the "count" subroutine for dimes and quarters is siimilar to the operation of nickels described above, except, of course, that the corresponding inputs, outputs and registers for dimes and quarters are involved. As is apparent from the above description, the "count" subroutine provides noise immunity by only decrementing a particular coin count in response to a coin detector pulse that has lasted at least 4.5 ms and is spaced at least 100 ms from any previous coin detect or pulse for that denomination. The exact choice of minimum acceptable coin pulse duration, will depend, of course, on the particular dispensing apparatus used.

In FIG. 19, I show the "bill return" routine which is entered when the serviceman supplies a low signal on the "bill return" line 150. The "bill return", or $\overline{\text{INT}}$, signal must appear on line 150 for at least 5 ms; otherwise the routine returns to the program block being executed prior to interrupt (blocks 1324–1330). If the interrupt signal is still active after the 5 ms delay (block 1328), the routine temporaily stores any fault code currently being displayed (block 1332) and provides lines A to D with a fault code of 8 (block 1334) to test the segments of the display.

Thereafter, if LMP is active, indicating the existence of a fault (block 1336), the routine waits (block 1338) of $\overline{\text{INT}}$ to return to its quiescent level of 1. When this occurs, the routine then displays the fault code, if any, that was previously stored (block 1340) and returns to the point in the program at which the interrupt was activated. If at block 1336 LMP is zero, the routine enables the REV and BPRSR lines while disabling all other lines (block 1344) and jumps (block 1346) to an entry point 1082 in the "reject" routine, to proceed thereafter to block 1084. As described above, this latter portion of the "reject38 routine shuts off the transport motor 28 and bill pressure solenoid 78 after the bill has been ejected from the transport.

It will be seen that I have accomplished the objects of my invention. My bill and coin changer reliably detects attempts to obtain credit fraudulently, including attempts to pull the currency back after initial insertion. My bill and coin changer reliably accepts genuine bills while reliably rejecting counterfeit bills, and is readily adjusted to accept genuine bills within a reasonable range of genuine bills. My bill and coin changer is relatively insensitive to changes in electronic circuit parameters, and can detect and dislodge objects that have become jammed in the transport path. My bill and coin changer facilitates detection and repair of mechanical or electronic component failures, and prevents the failure of one component from causing the failure of other components. My bill and coin changer prevents the uncontrolled dispensing of change in the event of component failure, as well as preventing the dispensing of erroneous change combinations.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A currency acceptor including in combination means for receiving an article of currency, means responsive to the introduction of said article of currency into said receiving means for accepting said article and generating credit therefor, said accepting means having a plurality of signal lines carrying signals indicating respective operational faults, means operable in the absence of the introduction of an article of currency into said receiving means for periodically scanning said signal lines to detect the presence or absence of a fault signal thereon, means responsive to the detection of a fault signal on one of said lines for disabling said accepting means, and means responsive to the detection of the subsequent absence of said fault signal for automatically re-enabling said accepting means.

2. Apparatus as in claim 1 including means responsive to the introduction of said article of currency into said receiving means for disabling said scanning means and means operable upon the generation of credit for said article of currency for re-enabling said scanning means.

3. Apparatus as in claim 1 including means responsive to the detection of said fault signal for generating a display indicating the existence of a fault.

4. Apparatus as in claim 1 including means responsive to the detection of said fault signal for generating a display indicating the existence of a fault and means responsive to the detection of the subsequent absence of said fault signal for terminating said display.

5. A bill acceptor including in combination means defining a path having an inlet, means for advancing a bill along said path from said inlet, means for sensing the introduction of a bill into said inlet, means responsive to said sensing means for actuating said advancing means, a plurality of signal lines carrying signals indicating respective operational faults, means operable in the absence of the introduction of a bill into said inlet for periodically scanning said signal lines to detect the presence or absence of a fault signal thereon, means responsive to the detection of a fault signal on one of said lines for disabling said actuating means, and means responsive to the detection of the subsequent absence of said fault signal for automatically re-enabling said actuating means.

6. Apparatus as in claim 5 including means responsive to the movement of said bill to a predetermined location along said path for accepting said bill and generating credit therefor, means responsive to said sensing means for disabling said scanning means, and means operable upon the generation of credit for said bill for re-enabling said scanning means.

7. A bill acceptor including in combination means defining a path having an inlet, means for advancing a bill along said path from said inlet, a plurality of sensors disposed at respective locations along said path, said plurality comprising an inlet sensor and at least one sensor disposed downstream of said inlet sensor, means operable in the absence of the introduction of a bill into said inlet for periodically scanning said sensors to detect an output therefrom, means responsive to the detection of an output from said inlet sensor by said scanning means for actuating said advancing means, means responsive to the detection of an output from said at least one downstream sensor by said scanning means for disabling said actuating means, and means responsive to the detection of the subsequent absence of said output from said at least one downstream sensor by said scanning means for automatically re-enabling said actuating means.

8. Apparatus as in claim 7 including means responsive to said sensors for determining the presence of a spurious bill in said path, means responsive to said determining means for reversing the direction of movement of said bill to return said bill to said inlet, means responsive to the detection of an output from said inlet sensor by said scanning means for disabling said scanning means, and means operable upon the return of said bill to said inlet for re-enabling said scanning means.

9. Apparatus as in claim 7 including an inlet sensor and a plurality of sensors downstream of said inlet sensor.

10. A bill acceptor including in combination means defining a path having an inlet, means for advancing a bill along said path from said inlet, a plurality of sensors disposed at respective locations along said path, said plurality comprising an inlet sensor and at least one sensor disposed downstream of said inlet sensor, means for periodically scanning said sensors to detect an output therefrom, means responsive to the detection of an output from said inlet sensor for disabling said scanning means and actuating said advancing means, means responsive to the detection of an output from said at least one downstream sensor for disabling said actuating means, means responsive to the detection of the subsequent absence of said output from said at least one downstream sensor for re-enabling said actuating means, means responsive to the movement of said bill to a predetermined location along said path for accepting said bill and generating credit therefor, and means operable upon the generation of credit for said bill for re-enabling said scanning means.

11. A bill acceptor including in combination means defining a path having an inlet, means for advancing a bill along said path from said inlet, a plurality of sensors disposed at respective locations along said path, said plurality comprising an inlet sensor and at least one sensor disposed downstream of said inlet sensor, means responsive to the detection of an output from said inlet sensor for actuating said advancing means, means responsive to the detection of an output from said at least one downstream sensor prior to the detection of an output from said inlet sensor for disabling said actuating means, and means responsive to the detection of the subsequent absence of said output from said at least one downstream sensor for automatically re-enabling said actuating means.

* * * * *